(12) United States Patent
Leleannec et al.

(10) Patent No.: US 11,375,189 B2
(45) Date of Patent: Jun. 28, 2022

(54) MULTIPLE SPLITS PRIORITIZING FOR FAST ENCODING

(71) Applicant: INTERDIGITAL VC HOLDINGS, INC., Wilmington, DE (US)

(72) Inventors: Fabrice Leleannec, Cesson-Sevigne (FR); Fabien Racape, Cesson-Sevigne (FR); Tangi Poirier, Cesson-Sevigne (FR); Gagan Rath, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 79 days.

(21) Appl. No.: 16/497,572

(22) PCT Filed: Mar. 23, 2018

(86) PCT No.: PCT/EP2018/057509
§ 371 (c)(1),
(2) Date: Sep. 25, 2019

(87) PCT Pub. No.: WO2018/177953
PCT Pub. Date: Oct. 4, 2018

(65) Prior Publication Data
US 2021/0266536 A1    Aug. 26, 2021

(30) Foreign Application Priority Data

Mar. 27, 2017 (EP) ..................................... 17305350

(51) Int. Cl.
*H04N 19/119* (2014.01)
*H04N 19/122* (2014.01)
(Continued)

(52) U.S. Cl.
CPC ......... *H04N 19/119* (2014.11); *H04N 19/122* (2014.11); *H04N 19/157* (2014.11); *H04N 19/176* (2014.11); *H04N 19/96* (2014.11)

(58) Field of Classification Search
CPC .. H04N 19/119; H04N 19/176; H04N 19/157; H04N 19/122; H04N 19/96
See application file for complete search history.

(56) References Cited

U.S. PATENT DOCUMENTS

2012/0230411 A1    9/2012  Liu et al.
2017/0208336 A1*   7/2017  Li ........................ H04N 19/105
(Continued)

FOREIGN PATENT DOCUMENTS

CN          102369733 A      3/2012
CN          102761742 A      10/2012
WO     WO 2018130472 A1      7/2018

OTHER PUBLICATIONS

Liu et al.. Remove partition size NxN, JCT-VC of ITU-T SG16 WP3 and ISO/IEC JTC1/SC29/WG11 4th Meeting Daegu, KR Jan. 20-28, 2011.

(Continued)

*Primary Examiner* — Nam D Pham
(74) *Attorney, Agent, or Firm* — Condo Roccia Koptiw LLP

(57) ABSTRACT

A block of video data is split using at least one splitting rule and coded using existing transform sizes through one of several embodiments. In one embodiment, the block is split using a triple tree splitting operation if said at least two rectangular sub-blocks can be achieved with two successions of split operations with at least one triple tree split. In another embodiment, the video block is split using an asymmetric binary tree splitting if said at least two rectangular sub-blocks can be achieved with two successions of split operations with at least one asymmetric binary split. In
(Continued)

Original block to encode

Quad-tree split

Binary split

Triple-split

Asymmetric split another embodiment, a video block is split using successive splits, using both of the rules of the other embodiments.

22 Claims, 31 Drawing Sheets

(51) Int. Cl.
*H04N 19/157* (2014.01)
*H04N 19/176* (2014.01)
*H04N 19/96* (2014.01)

(56) References Cited

U.S. PATENT DOCUMENTS

2019/0246107 A1 8/2019 Le Leannec et al.
2020/0014957 A1 1/2020 Kim et al.

OTHER PUBLICATIONS

Suehring, et al., JVET Common Test Conditions and Software Reference Configurations, JVET of ITU-T SG16 WP3 and ISO/IEC JTC1/SC29/WG11 2nd Meeting: San Diego, USA, Feb. 20-26, 2016.
Chen et al., Algorithm Description of Joint Exploration Test Model 3, Joint Video Exploration Team (JVET) of ITU-T SG WP 3 and ISO/IEC JTC 1/SC 29/WG 11, 3rd Meeting: Geneva, CH, May 26-Jun. 1, 2016.
High Efficiency Video Coding, Series H: Audiovisual and Multimedia Systems Infrastructure of Audiovisual Services—Coding of Moving Video, ITU-T Telecommunication Standardization Sector of ITU, H.265 (Apr. 2015).
An et al., Block partitioning structure for next generation video coding, ITU-T Draft; Study Period 2013-2016, ITC, Geneva, CH, vol. 6/16, Sep. 29, 2015, pp. 1-8.
Le Leannec et al., Asymmetric coding units in QTBT, JVET of ITU-T SG 16 WP 3 and ISO/IEC JTC 1/SC 29/WG 11 4th Meeting; Chengdu, CN, Oct. 15-21, 2016.
Li et al., Multi-type-tree, JVET of ITU-T SG 16 WP 3 and ISO/IEC JTC 1/SC 29/WG 11 4th Meeting: Chengdu, CN, Oct. 15-21, 2016.
Le Leannec et al., "Asymmetric Coding Units in QTBT", Joint Video Exploration Team (JVET) of ITU-T SG 16 WP 3 and ISO/IEC JTC 1/SC 29/WG 11, Document No. JVET-D0064, 4th Meeting, Chengdu, China, Oct. 15, 2016, 10 pages.
Machine Translation of CN 102761742A, published Oct. 31, 2012.

* cited by examiner

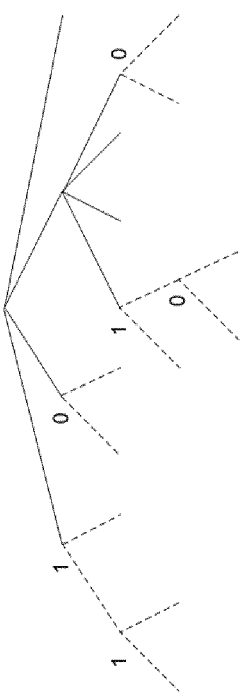
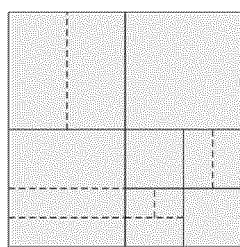
Figure 4

MULTIPLE SPLITS PRIORITIZING FOR FAST ENCODING

CROSS-REFERENCE TO RELATED APPLICATIONS

This application is a 35 U.S.C. § 371 National Stage of PCT Application No. PCT/EP2018/057509, filed Mar. 23, 2018, which claims priority to EP patent application 17305350.5, filed Mar. 27, 2017, the contents of all of which are hereby incorporated by reference herein in their entireties.

FIELD OF THE INVENTION

The present principles relate to the field of video compression.

BACKGROUND OF THE INVENTION

In the HEVC video compression standard (International Telecommunication Union, ITU-T H.265 High Efficiency Video Coding), a picture is divided into so-called Coding Tree Units (CTU), whose size is typically 64×64, 128×128, or 256×256 pixels.

Each CTU is represented by a Coding Tree in the compressed domain. This is a quad-tree division of the CTU, where each leaf is called a Coding Unit (CU), as shown in FIG. 1.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

The Partitioning of a Coding Unit into Prediction Unit(s) is done according to the partition type, signaled in the bit-stream. For Intra coding unit, only the partition types 2N×2N and N×N, illustrated in FIG. 3, are used. This means only square Prediction Units are used in Intra Coding Units.

On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain is proposed, in order to represent picture data in a more flexible way in the compressed domain. The advantage of this flexible representation of the coding tree is that it provides increased compression efficiency compared to the CU/PU/TU arrangement of the HEVC standard.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated in FIG. 4. The QTBT representation on a block is illustrated in FIG. 15.

The splitting of a coding unit is decided on the encoder side through a rate distortion optimization procedure, which consists in determining the QTBT representation of the CTU with minimal rate distortion cost.

In the QTBT technology, a CU has either square or rectangular shape. The size of coding unit is always a power of 2, and typically goes from 4 to 128.

In additional to this variety of rectangular shapes for a coding unit, this new CTU representation has the following different characteristics compared to HEVC:

The QTBT decomposition of a CTU is made of two stages: first the CTU is split in a quad-tree fashion, then each quad-tree leaf can be further divide in a binary fashion. This is illustrated on the right of FIG. 4 where solid lines represent the quad-tree decomposition phase and dashed lines represent the binary decomposition that is spatially embedded in the quad-tree leaves.

In intra slices, the Luma and Chroma block partitioning structure is separated, and decided independently.

No more CU partitioning into predictions units or transform unit is employed. In other words, each Coding Unit is systematically made of a single prediction unit (previously 2N×2N prediction unit partition type) and single transform unit (no division into a transform tree).

However, further improved compression efficiency is needed compared to QTBT technology. In disclosure, "Asymmetric Coding Units Codec Architecture" (EP-IPA 16306308.4), Coding Units with new rectangular shapes are introduced which result from a new Binary Splitting Mode called asymmetric splitting mode.

SUMMARY OF THE INVENTION

These and other drawbacks and disadvantages of the prior art are addressed by at least one of the described embodiments, which are directed to a method and apparatus for coding or decoding a block of video data. In at least one embodiment, it is proposed to combine a rich set of coding unit splitting modes aimed at providing a flexible rectangular block-based representation of a picture in the compressed domain, while ensuring no redundancy between these splitting modes in terms of spatial topology.

According to at least one general embodiment described herein, there is provided a method for coding a block of video data. The method comprises dividing a block into at least two rectangular sub-blocks with binary or triple splits using at least one splitting rule, and then encoding a sub-block using a transform corresponding to sub-block size.

According to at least one general embodiment described herein, there is provided a method for decoding a block of video data. The method comprises decoding at least one sub-block using an inverse transform corresponding to the sub-block size and then reassembling at least two sub-blocks into a block by using an inverse of at least one splitting rule.

According to another general embodiment described herein, there is provided an apparatus for coding a block of video data. The apparatus comprises a memory, and a processor, configured to divide a block into at least two rectangular sub-blocks using at least one splitting rule, and then encode a sub-block using a transform corresponding to sub-block size.

According to another general embodiment described herein, there is provided a method for encoding a block of video data. The method comprises encoding at least one sub-block using a splitting rule that comprises using a triple tree splitting operation if said at least two rectangular sub-blocks can be achieved with two successions of split operations with at least one triple tree split, and using a asymmetric binary tree splitting if said at least two rectangular sub-blocks can be achieved with two successions of split operations with at least one asymmetric binary split, and encoding the sub-blocks using a transform corresponding to sub-block size.

According to another general embodiment described herein, there is provided a method for decoding a block of video data. The method comprises inverse transforming sub-blocks and then reassembling the sub-blocks using rules comprising using a triple tree splitting operation if said at least two rectangular sub-blocks can be achieved with two successions of split operations with at least one triple tree split, and using a asymmetric binary tree splitting if said at least two rectangular sub-blocks can be achieved with two successions of split operations with at least one asymmetric binary split.

According to another general embodiment described herein, there is provided any of the above embodiments wherein, dividing comprises splitting the block into sub-blocks using one-half splits, one-third and two-third splits, one-fourth and three-fourth splits, where the splits can be either in a horizontal or a vertical direction.

According to another general embodiment, no prioritization between asymmetric tree and binary symmetric tree is applied, and some redundancy is allowed between different successions of splits that may reach a same spatial topology when dividing a CU into smaller coding units.

According to another general embodiment, the prioritization of triple split over binary split is used in combination with allowing some redundancy between the asymmetric binary split and the binary symmetric split.

According to another aspect described herein, there is provided a nontransitory computer readable storage medium containing data content generated according to the method of any one of the aforementioned method embodiments, or by the apparatus of any one of the aforementioned apparatus embodiments for playback using a processor.

According to another aspect described herein, there is provided a signal comprising video data generated according to the method of any one of the aforementioned method embodiments for coding a block of video data, or by the apparatus of any one of the aforementioned apparatus embodiments for coding a block of video data, for playback using a processor.

According to another aspect described herein, there is provided a computer program product comprising instructions which, when the program is executed by a computer, cause the computer to carry out the method of any one of the aforementioned method embodiments.

These and other aspects, features and advantages of the present principles will become apparent from the following detailed description of exemplary embodiments, which is to be read in connection with the accompanying drawings.

BRIEF DESCRIPTION OF THE DRAWINGS

FIG. 4 shows an example quad-tree plus binary-tree coding tree unit representation.

DETAILED DESCRIPTION

For clarity, in this description, "dividing", "segmenting" and "splitting" all mean the same thing, which is the act of performing a straight-line division of a block of pixels. Similarly, "splits", and "divisions" mean the same thing, a grouping of pixels as a result of dividing, splitting or segmenting a block or a sub-block.

In the HEVC video compression standard, a picture is divided into so-called Coding Tree Units (CTU), with typical sizes of 64×64, 128×128, or 256×256 pixels.

Figure 1:
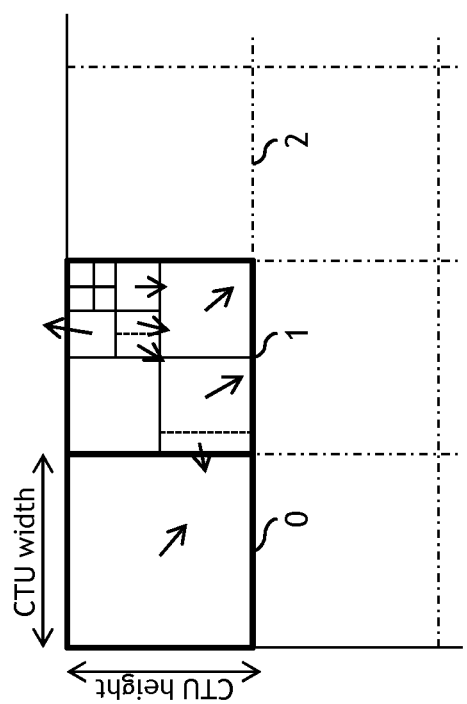
FIG. 1 shows one example of a coding tree unit and coding tree concepts to represent a compressed picture.

Each CTU is represented by a Coding Tree in the compressed domain. This is a quad-tree division of the CTU, where each leaf is called a Coding Unit (CU), see FIG. 1.

Figure 2:
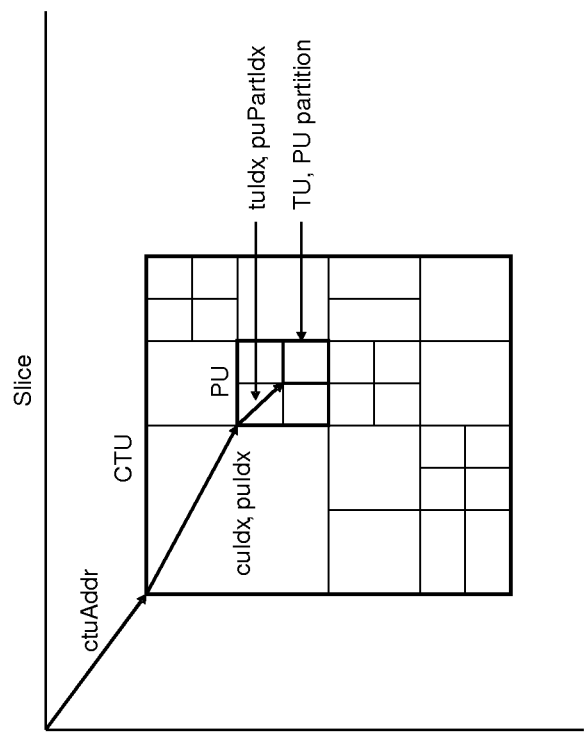
FIG. 2 shows an example of the division of a coding tree unit into coding units, prediction units and transform units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

Figure 3:
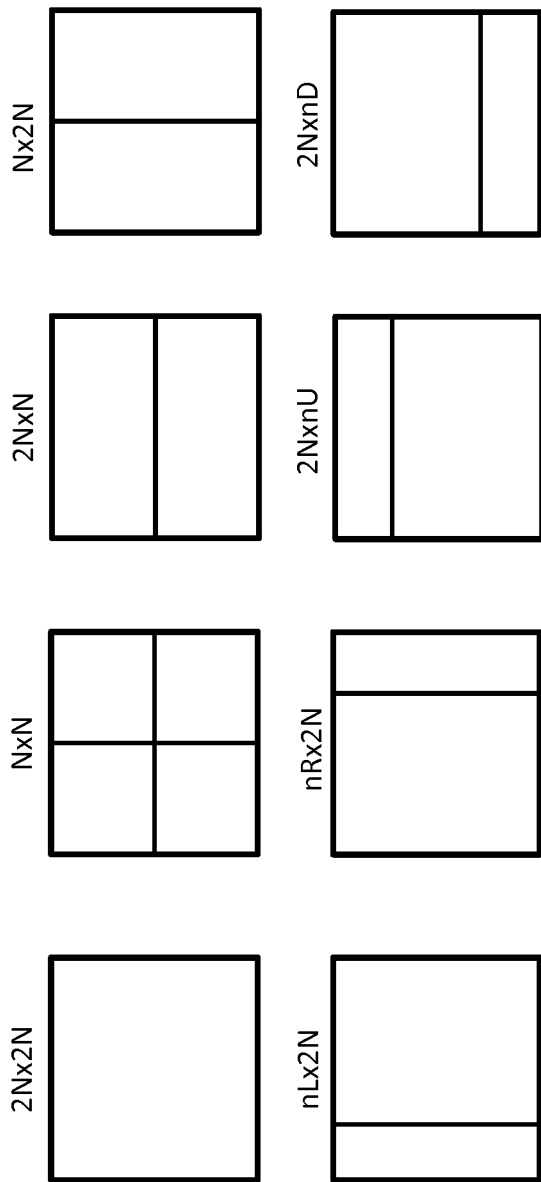
FIG. 3 shows an example of partitioning of coding units.

The Partitioning of a Coding Unit into Prediction Unit(s) is done according to the partition type, signaled in the bit-stream. For Intra coding unit, only the partition types 2N×2N and N×N, illustrated in FIG. 3 are used. This means only square Prediction Units are used in Intra Coding Units.

On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain in order to represent picture data in a more flexible way in the compressed domain. The advantage of this flexible representation of the coding tree is that it provides increased compression efficiency compared to the CU/PU/TU arrangement of the HEVC standard.

The Quad-Tree plus Binary-Tree (QTBT) coding tool provides this increased flexibility. It consists in a coding tree where coding units can be split both in a quad-tree (4 sub-units) and in a binary-tree (2 sub-units) fashion. Such coding tree representation of a Coding Tree Unit is illustrated in FIG. 4.

The splitting of a coding unit is decided on the encoder side through a rate distortion optimization procedure, which consists in determining the QTBT representation of the CTU with minimal rate distortion cost.

In the QTBT technology, a CU has either square or rectangular shape. The size of coding unit is always a power of 2, and typically goes from 4 to 128.

In additional to this variety of rectangular shapes for a coding unit, this new CTU representation has the following different characteristics compared to HEVC:

The QTBT decomposition of a CTU is made of two stages: first the CTU is split in a quad-tree fashion, then each quad-tree leaf can be further divided in a binary fashion. This is illustrated on the right of FIG. 4 where solid lines represent the quad-tree decomposition phase and dashed lines represent the binary decomposition that is spatially embedded in the quad-tree leaves.

In intra slices, the Luma and Chroma block partitioning structure is separated, and decided independently.

No more CU partitioning into predictions units or transform unit is employed. In other words, each Coding Unit is systematically made of a single prediction unit (previously 2N×2N prediction unit partition type) and single transform unit (no division into a transform tree).

The described embodiments concern the domain of picture coding unit representation in compression and aims at further improved compression efficiency compared to QTBT technology.

In another application, (Asymmetric Coding Units Codec Architecture, EP-EPA 16306308.4), it is proposed to introduce new asymmetric partitions in QTBT. These new shapes consist in sizes equal to $3 \cdot 2^n$ in width and/or height. Furthermore, a CU with a size multiple of 3 in width or height can be further split in a binary fashion, horizontally or vertically. We call this type of split, a one quarter split.

These embodiments support the coding/decoding with current one quarter split, when one of the sub-blocks has a size $3 \cdot 2^n$ in one direction. If we split this sub-block again with a one quarter split in the same direction, we will obtain 2 blocks of size $3 \cdot 2^{n-2}$ and $3^2 \cdot 2^{n-2}$ in the same direction. For example, two successive asymmetric horizontal top split: a block 32×32 is first divided into 32×8 and 32×24, the second sub-block is then divided further in 32×6 and 32×18.

A drawback is that blocks of size 18 cannot be divided by 4, so it can't be further split. Successive asymmetric splits will lead to many different block sizes. Many different block sizes will require many new transform sizes associated with each block size. These transforms require a lot of memory for a fast and efficient implementation.

Figure 7:
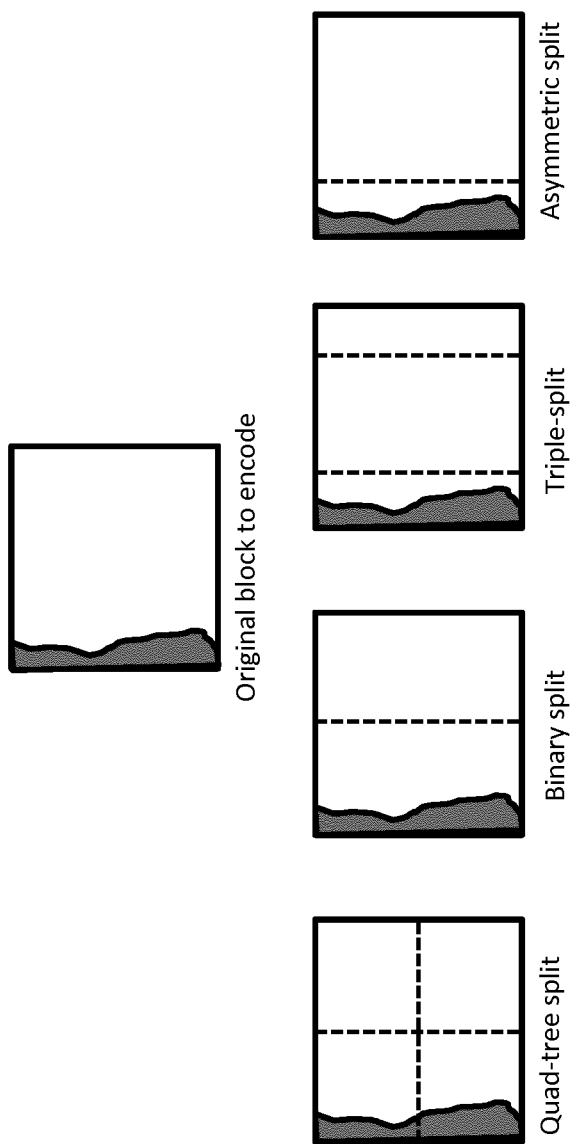
FIG. 7 shows different splits of a block to handle a block non-uniformity.

In a first prior approach, triple-trees are introduced. Triple trees, or triple splits, are splitting of a coding unit or sub-unit into three portions. One of the advantage is that all sub-blocks are a power of 2. The main drawback is that it does not offer as much flexibility to optimally choose the partitioning of the block as it forces three sub-blocks, even if only two are necessary, for example, when the boundary of an object is passing close to the border (see FIG. 7, triple-split vs asymmetric split).

The basic idea of a second prior approach (EP-EPA 16306308.4) is to have an asymmetric split ratio dependent on the block size. For a coding unit with size (w, h) (width and height) with height $2^n$, asymmetric split type HOR_UP (horizontal-up) leads to 2 sub-coding units with respective rectangular sizes $$\left(w, \frac{h}{4}\right) \text{ and } \left(w, \frac{3h}{4}\right).$$

But for a coding unit with size (w, h) with height $3 \cdot 2^n$, asymmetric split type HOR_DOWN (horizontal-down), will lead to 2 sub-coding units with respective rectangular sizes $$\left(w, \frac{2h}{3}\right) \text{ and } \left(w, \frac{h}{3}\right).$$

we call this type of split, a one third split.

Figure 9:
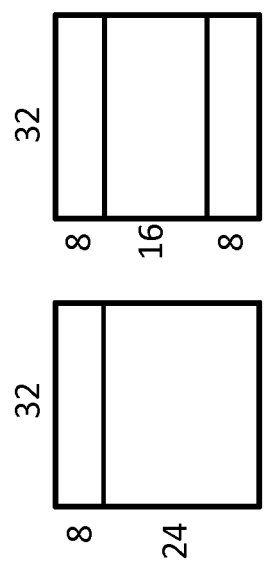
FIG. 9 shows a first asymmetric split (HOR_UP ¼) followed by a second asymmetric split (HOR_DOWN ⅓) of a block.

For example, for a block 32×32, a first asymmetric split (a one quarter split) leads to 32×8 and 32×24 blocks, a second asymmetric split (a one third split) for the second sub-block leads to 32×16 and 32×8 sub-blocks, as shown in FIG. 9. So, the splitting size (one-quarter/one-third split) depends on the current size of the block.

Therefore, a CU with width or height equal to $3 \cdot 2^n$ may be selected by the encoder. In such case, an Intra prediction and Inter process of some rectangular blocks with size multiple of 3 are performed. Additionally, a 2D transform with size $3 \cdot 2^n$ in width or height, and the subsequent transform coefficient entropy coding process are performed. These technical aspects did not exist in HEVC or in QTBT.

A last coding unit splitting mode, called the horizontal or vertical triple tree splitting mode, consists in dividing a coding unit (CU) into 3 sub-coding-units (sub-CUs), with respective sizes equal ¼, ½ and ¼ of the parent CU size in the direction of the considered spatial division. This is illustrated in FIG. 6.

Figure 5:
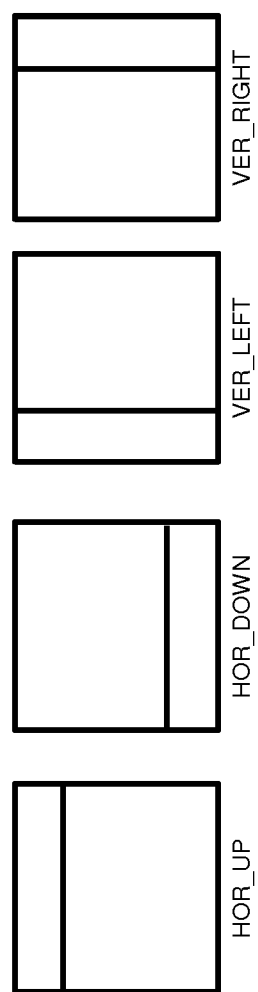
FIG. 5 shows examples of additional coding unit binary asymmetric splitting modes in QTBT.
Figure 6:
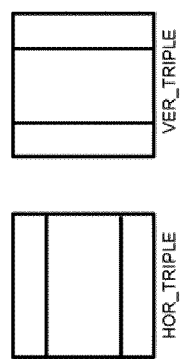
FIG. 6 shows triple mode splitting of a block.

One context of the described embodiments is a video coding/decoding scheme where all the CU splitting modes from FIG. 4, FIG. 5 and FIG. 6 are activated in the video coding, which means the encoder can choose any of these splitting modes and signal them to the decoder.

Figure 8:
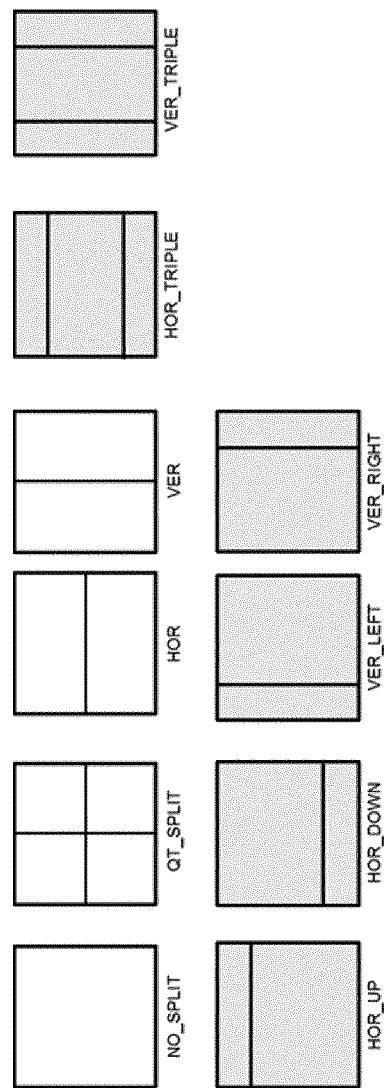
FIG. 8 shows the set of all Coding Unit spitting modes supported in the video coding scheme herein described.

The whole set of CU splitting modes present in such codec are shown in FIG. 8.

FIG. 8 illustrates the set of all Coding Unit splitting modes supported in the video coding scheme considered herein. In actual video images, this rich set of coding unit topologies help in having coding structures that spatially match the structures and discontinuities contained in an original signal.

Figure 10:
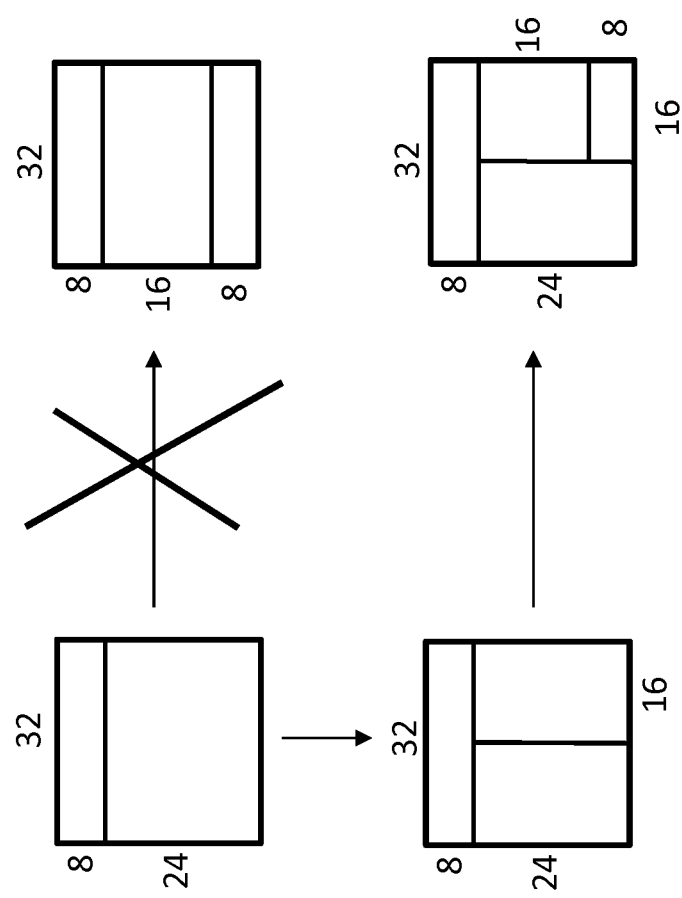
FIG. 10 shows a Coding Unit splitting configuration (bottom right) that can be achieved with a related coding scheme.

FIG. 10 shows a Coding Unit splitting configuration (bottom right) that can be achieved with a coding scheme of a related application.

Figure 11:
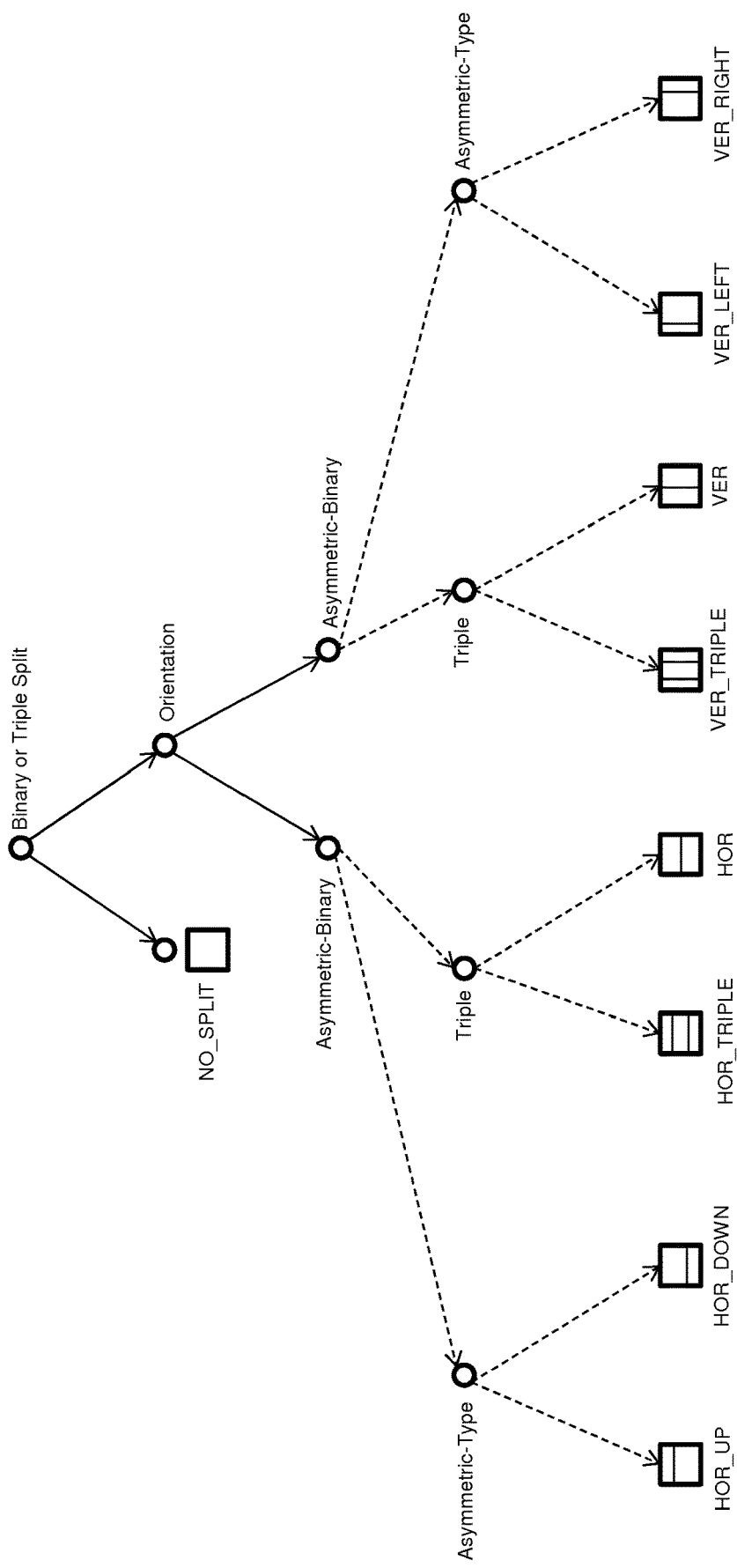
FIG. 11 shows a syntax arrangement for binary and triple tree splitting.

FIG. 11 shows a syntax arrangement for binary and triple tree splitting.

The aforementioned prior approach provides an asymmetric splitting process where the size ratio between the sub-CU and the parent-CU depends on the size of the parent CU. This allows cascading several asymmetric splitting operations of a given CU, potentially leading to the configuration of FIG. 9.

Figure 14:
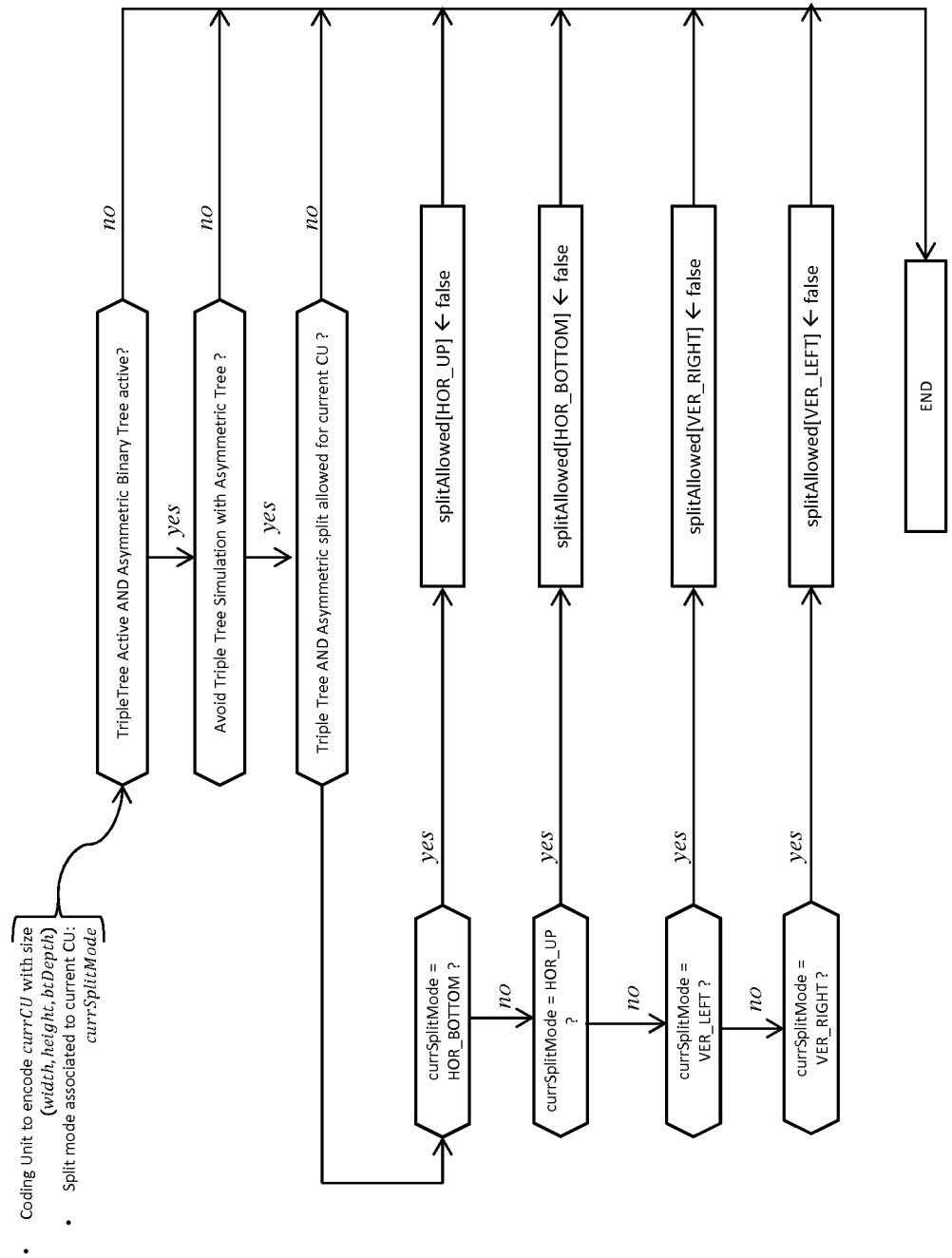
FIG. 14 shows an example of a restriction on the use of asymmetric binary trees to prevent the replication of a triple tree operation.
Figure 15:
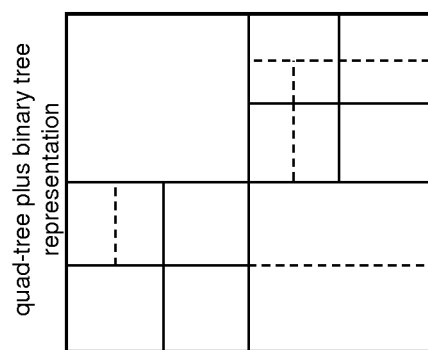
FIG. 15 shows one embodiment of a the Quad Tree plus Binary Tree representation on a coding block.

FIG. 14 shows an example of a restriction on the use of asymmetric binary trees to prevent the replication of a triple tree operation.

Figure 16:
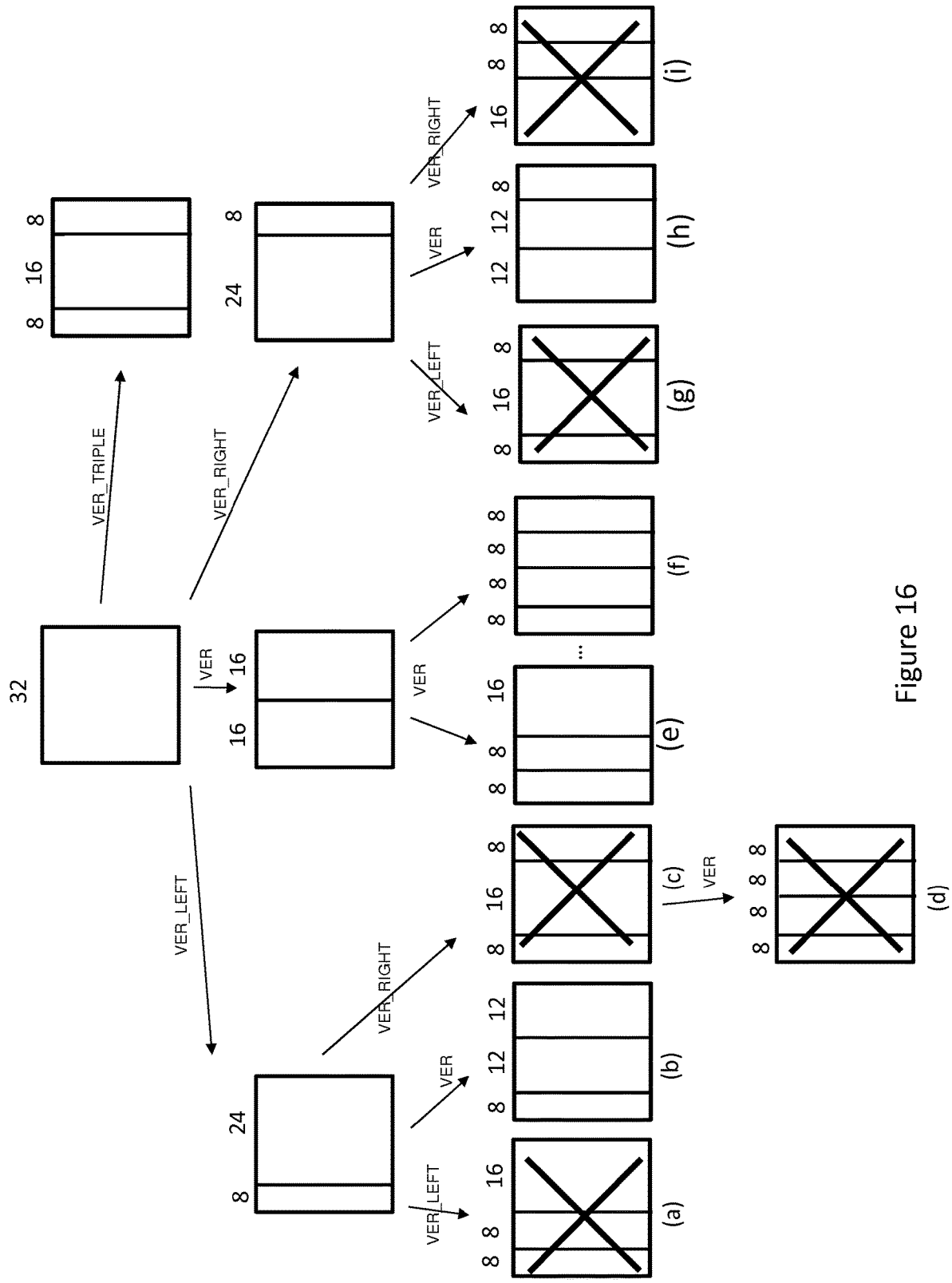
FIG. 16 shows an example of restriction in a related approach.

FIG. 16 shows an example of restriction in an alternate approach.

In addition, some restrictions are put on the use of asymmetric binary tree splitting in the prior invention (EP-EPA 16306308.4). These restrictions prevent an encoder from reaching a given configuration of spatial divisions of a coding unit through different successions of splits. Typically, it prevents the asymmetric binary tree to simulate the binary tree (see FIG. 22). In addition, in the coding system described herein, some restrictions are put in place to avoid redundancy between triple and symmetric binary split modes, to avoid reaching an equivalent CU partitioning through different splitting paths. This is illustrated on the right side of FIG. 22. As can be seen, priority is given to the succession of symmetric binary splits over a succession of splits including a triple one, which would lead to the same overall topology.

Figure 22:
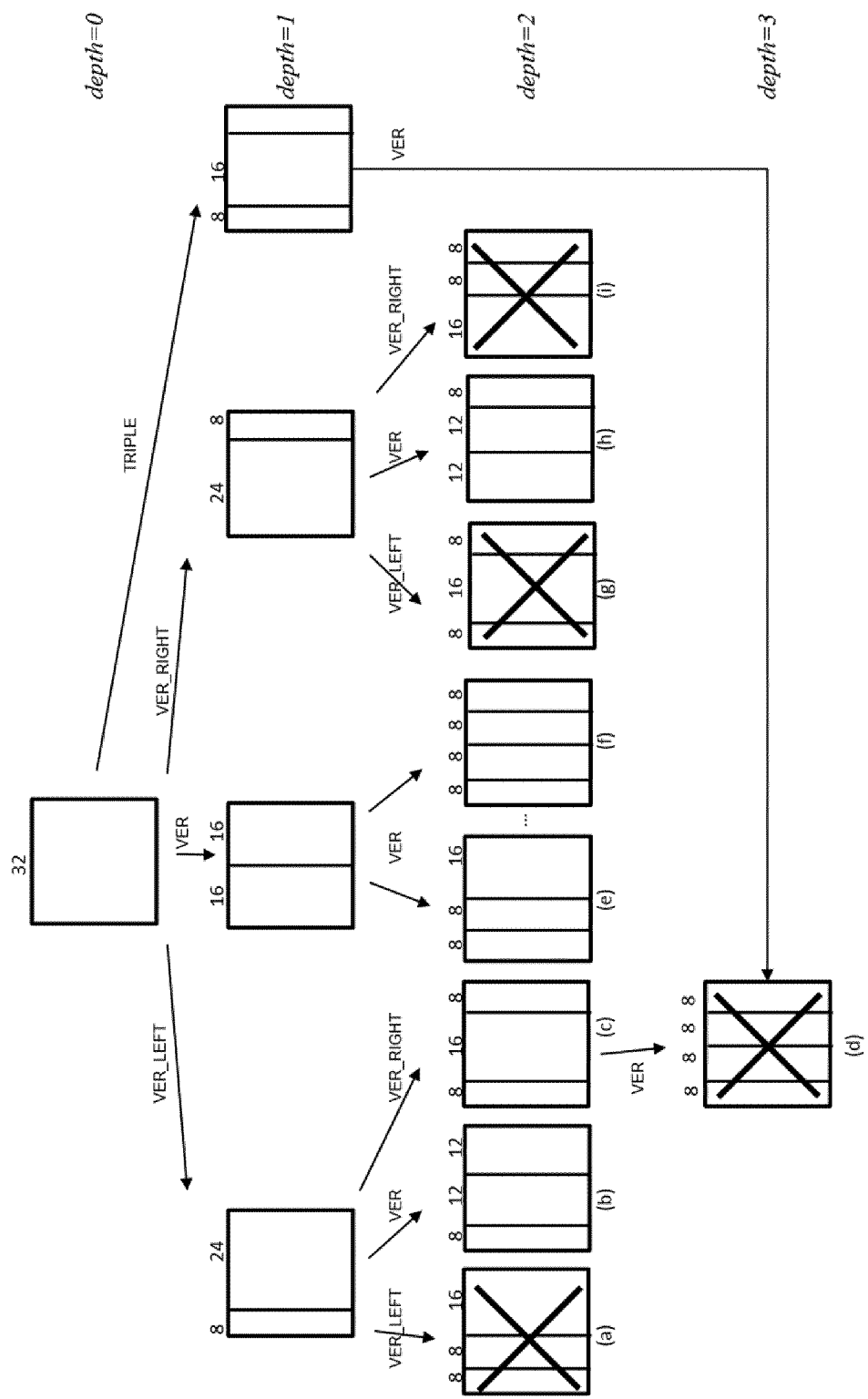
FIG. 22 shows an example of restriction to avoid redundancies between asymmetric and symmetric binary trees.

However, the restrictions used in the prior art, as shown in FIG. 22, lead to sub-optimal coding efficiency in case a fast coding configuration is used.

Indeed, a way to limit the complexity of the encoder is to limit the combinations of rate distortion searches performed on the encoder side. This can be done by reducing the maximum binary/triple tree depth for some slice types or some temporal layers of the coded video stream, whose coded pictures are organized according to the random access coding structure.

Figure 23:
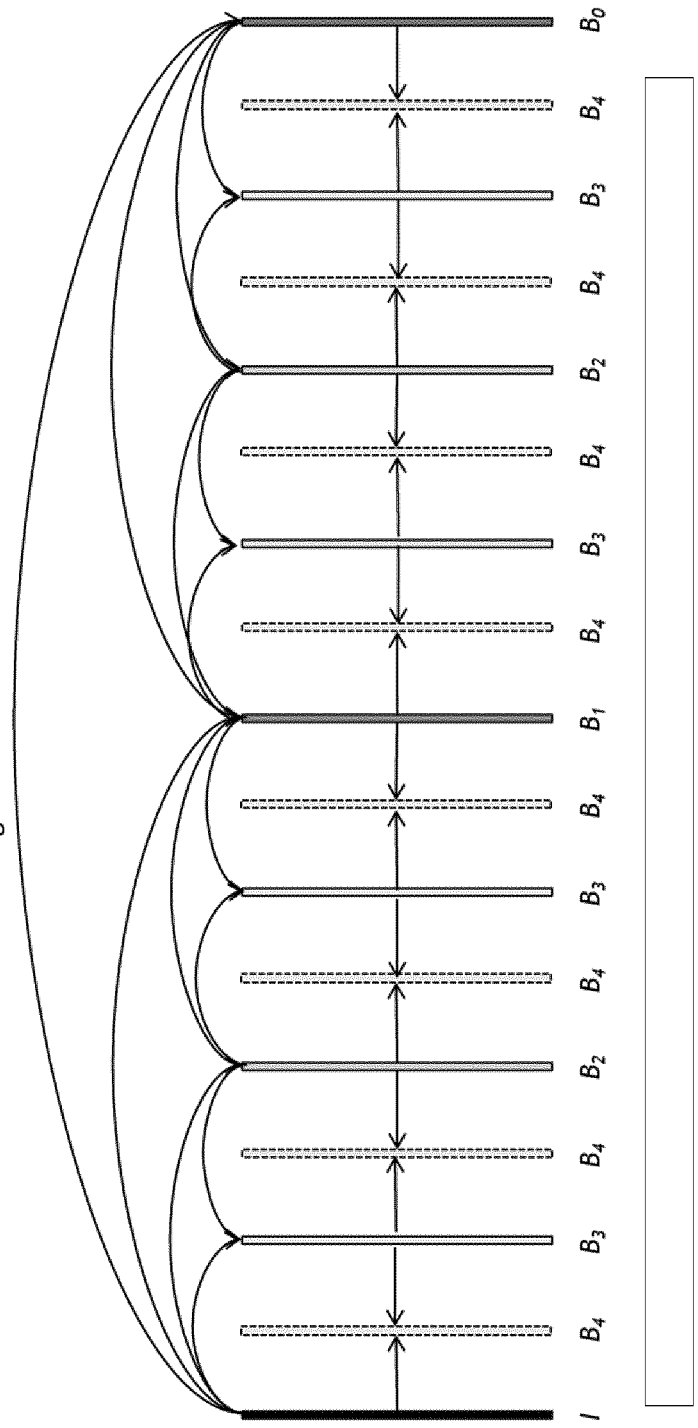
FIG. 23 shows an example of a hierarchical B picture temporal coding structure with temporal layers.

This "random access" coding structure used to compress a video is shown in FIG. 23. It is made of periodic Intra Pictures, with hierarchical B pictures between them. A temporal layer (or level) of a video stream that employs hierarchical B pictures coding structure is illustrated in FIG. 23. A picture belonging to a given temporal level can be temporally predicted from pictures belonging to temporal levels less than or equal to a current picture's temporal level. But it cannot be predicted from a picture with a higher temporal level. This temporal coding structure provides both good coding efficiency and temporal scalability features.

To limit the combinations of the Rate Distortion (RD) search on the encoder side, one can choose to use a binary/triple tree depth at less than or equal to 3 in Intra pictures, and less than or equal to 2 in B pictures. An alternate embodiment would comprise setting a reduced maximum depth in pictures with temporal level higher than a given threshold, for instance 1, 2 or 3.

One problem addressed by the described embodiments is maximizing coding efficiency when a larger set of CU split modes, as shown in FIG. 8, is employed together with a limited maximum depth in the binary/triple tree representation of a CU.

A first way to solve the problem is to forbid the binary asymmetric splitting as well as a triple tree splitting wherever they are redundant with the binary tree, as was previously proposed, shown in FIG. 22.

It has the advantage of using all available split modes in a non-redundant way, ensuring limited RD search combinations. The drawback is that it is not optimal from a coding efficiency standpoint.

So, one objective of the described embodiments is to maximize the number of reachable topologies when dividing a CU into sub-CUs, under the constraint of a given set of binary, asymmetric and triple split modes, and a limited maximum depth in the binary/triple representation of a CU (typically equal to 2).

This maximization is obtained through the following technical objectives:

1. Give priority to triple tree splitting over binary tree splitting wherever a given topology (sub-block division configuration) can be reached with different successions of two split operations, one including a triple tree split and the other one including only binary split operations.
2. Given priority to asymmetric binary tree splitting over symmetric binary tree splitting wherever a given topology can be reached with different series of two splits operations, one of them including an asymmetric split and the other including only binary splitting.

Figure 24:
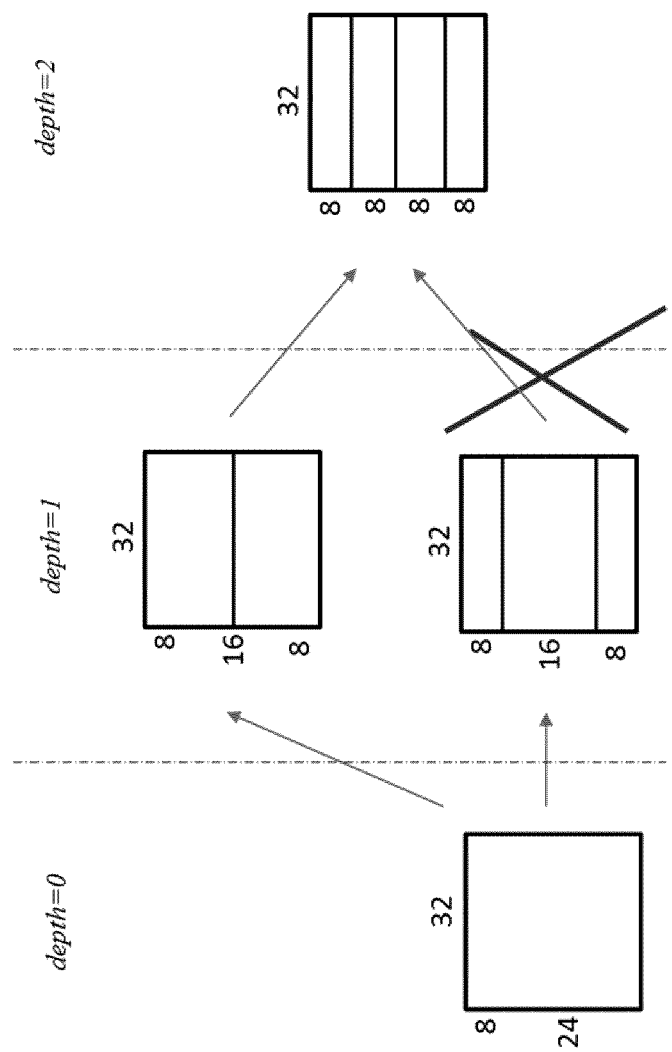
FIG. 24 shows a related approach to prevent non-symmetric and non-binary splitting from simulating symmetric binary split modes.
Figure 25:
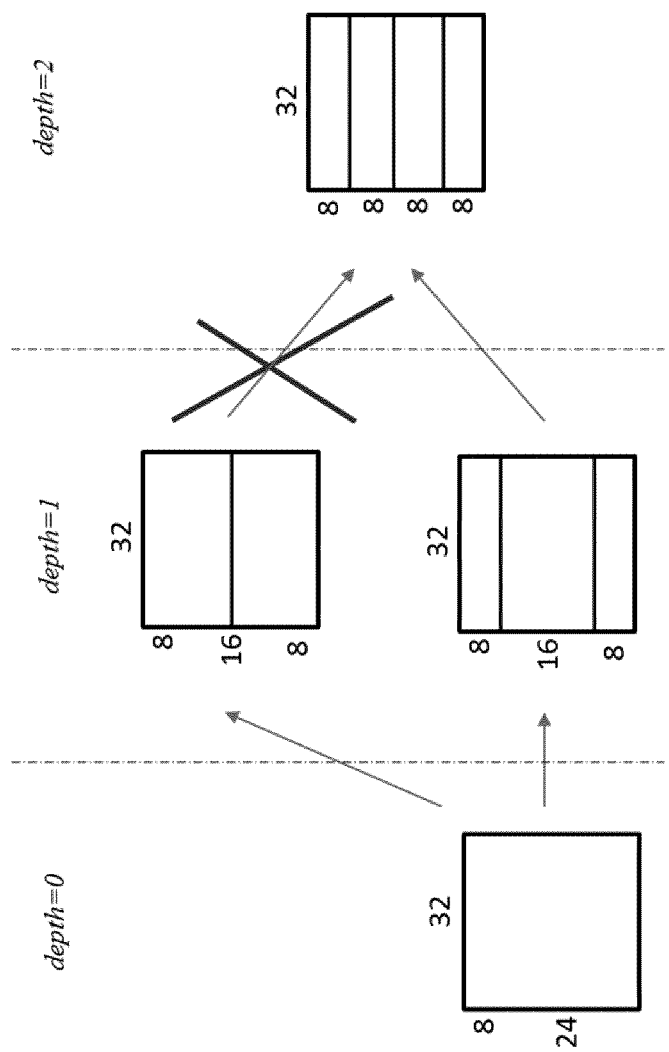
FIG. 25 shows one example of a principle of the proposed solution described herein.

With regards to the triple tree case, the difference with the prior art of FIG. 22 is illustrated on FIG. 24 and FIG. 25. FIG. 22 shows the prior art policy, which prevents using triple tree splitting to reach the topology shown on the right side of the figure, because it can be reached through symmetric binary tree splitting only.

FIG. 25 shows the policy resulting from the proposed method. Here the binary tree splits are disallowed if they lead to an overall CU topology that can be reached through a triple tree split operation. The lowest priority is given to symmetric binary split modes compared to triple and asymmetric binary split modes.

Figure 26:
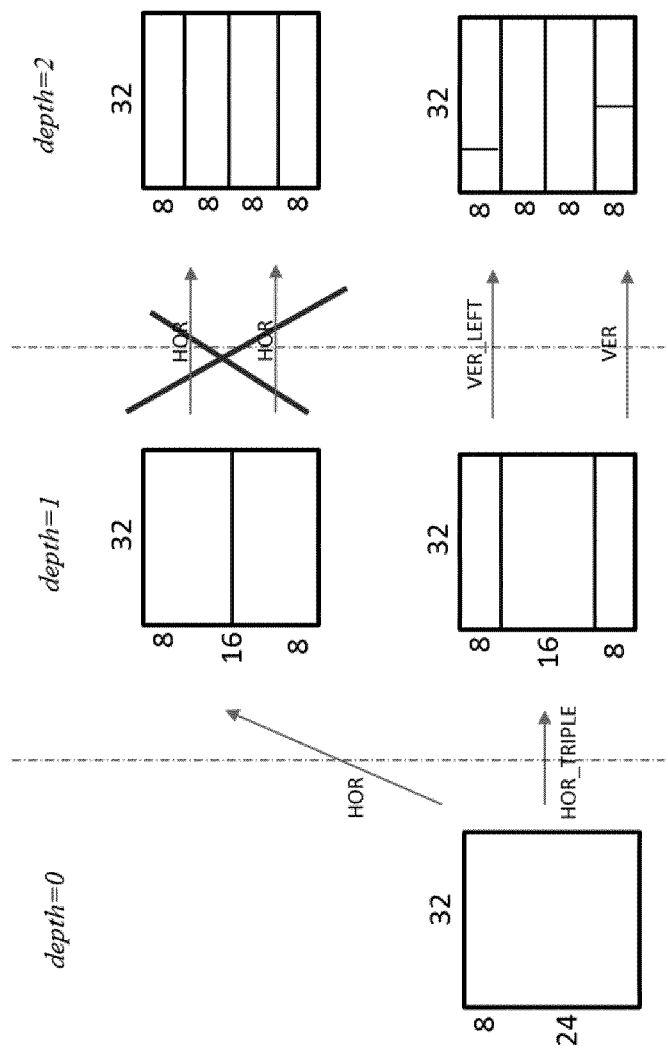
FIG. 26 shows another example of a principle of the proposed solution described herein.

The advantage of the proposed method is the ability to reach a greater number of topologies than with the prior art method, which limits the maximum depth of the binary/triple coding tree to 2. FIG. 26 shows some typical topologies that can be obtained with the proposed method, and could not be reached using the prior art method. On the bottom-right part of FIG. 26, one sees a CU topology where the small sub-CU issued are further divided in the opposite direction of the triple tree split (respectively with the VER_LEFT and VER split modes). A restriction is placed on the use of symmetric binary tree splitting to prevent it from simulating topologies reachable through the triple tree splitting mode. Such further division was not possible in the prior art where one additional depth level was needed for that.

Figure 27:
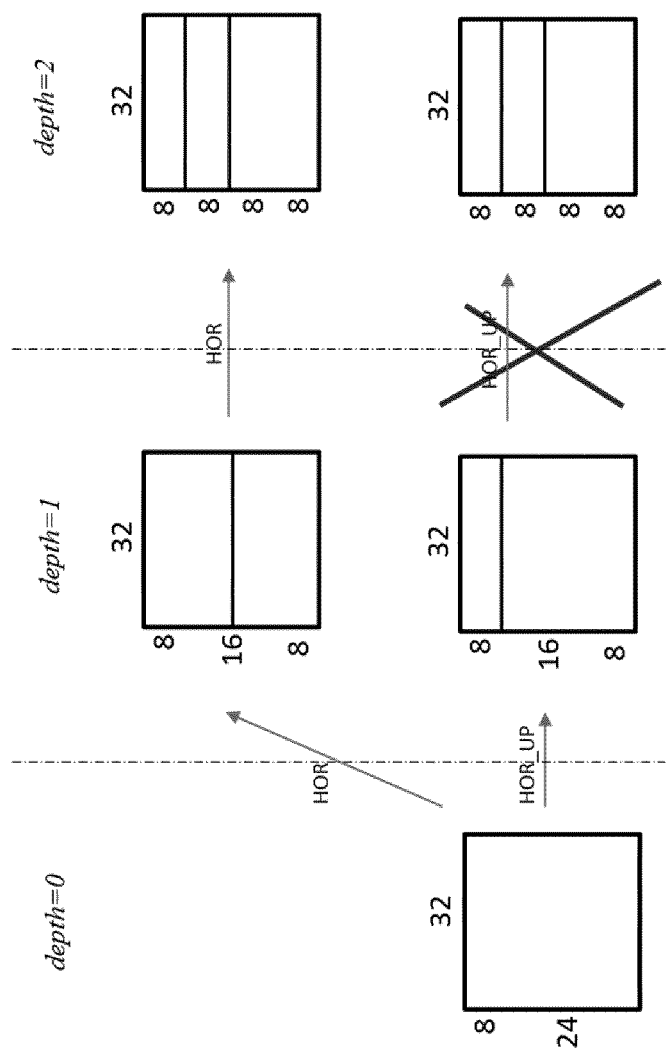
FIG. 27 shows an example restriction in a related approach.

FIG. 27 shows the prior art method regarding the redundancy avoidance between the symmetric binary and asymmetric binary split modes. This consisted in disallowing a series of 2 splits, which includes an asymmetric split and leads to a topology that can be reached through a series of symmetric splits only.

Figure 28:
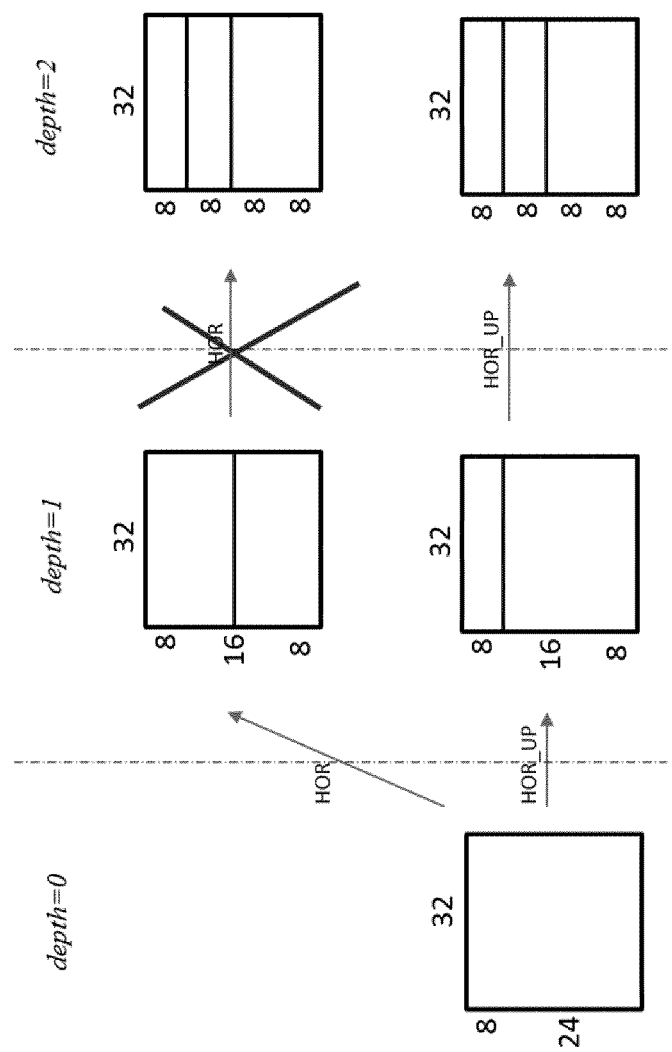
FIG. 28 shows an example of prioritization of asymmetric binary tree splitting compared to symmetric binary tree splitting.

The method proposed in at least one of the current embodiments consists in the opposite, i.e. it disallows the series of 2 successive split that employs only symmetric splits, if it reaches a topology that can be reached through a series of 2 successive splits that includes an asymmetric split. This is illustrated in FIG. 28.

Figure 29:
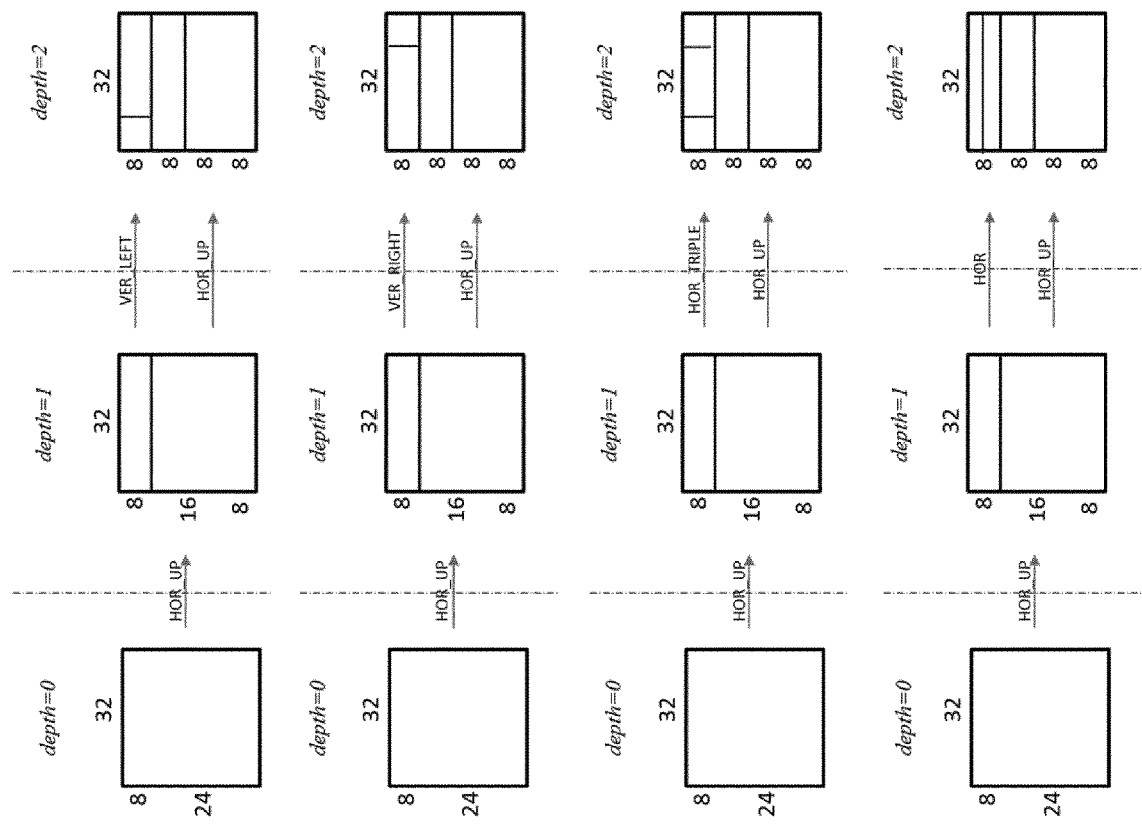
FIG. 29 shows some example topologies that can be reached by the methods proposed herein with maximum tree depth of 2 that cannot be reached by related methods.

One advantage with the newly proposed method can be seen in FIG. 29. The right side of FIG. 29 shows several typical topologies that can be obtained with the proposed method within 2 binary/triple tree depth levels, and which cannot be obtained with the prior art method. One sees that in addition to obtaining a symmetric binary decomposition of the parent CU from depth level 0, it is now possible to further divide the smaller sub-CU resulting from asymmetric splitting into smaller blocks. This can help in isolating singularities in the original picture to encode in an efficient way, thus improving overall coding efficiency.

According to at least one other embodiment, no prioritization between asymmetric tree and binary symmetric tree is applied, and some redundancy is allowed between different successions of splits that may reach a same spatial topology when dividing a CU into smaller coding units.

Figure 30:
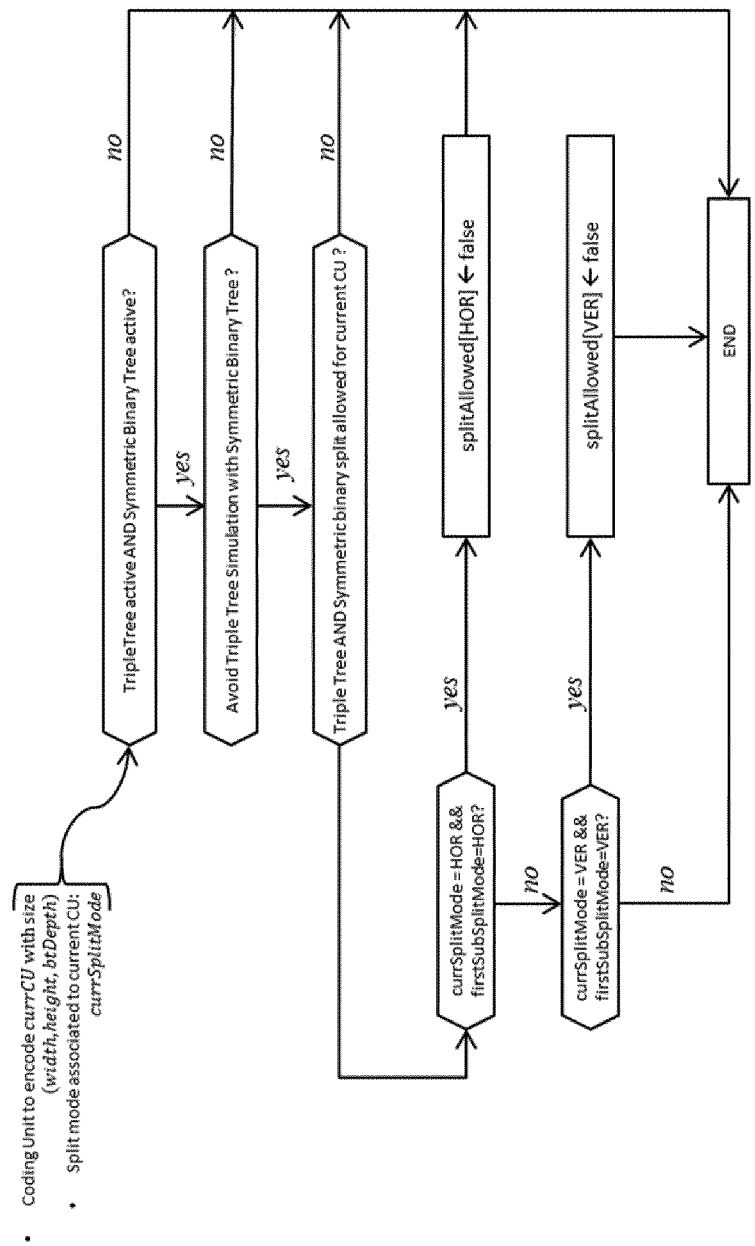
FIG. 30 shows an example of an embodiment to prioritize triple tree splitting over symmetric binary tree splitting proposed herein.

Next, the process used to apply the prioritization of triple tree over binary tree as proposed herein is described. In case Triple and Binary Symmetric splits are activated and allowed for a current CU, then two main steps take place, respectively, for the horizontal and the vertical direction. One embodiment of the process is shown in FIG. 30.

Each of these main steps comprises the following, for example, for the horizontal orientation. The method tests if the split mode of a current CU is equal to the binary horizontal split mode HOR and if the first sub-CU of a current CU has been divided through the HOR split mode. If so, then the HOR split mode is forbidden for the second sub-CU of the current CU.

An analogous process is performed for the vertical orientation.

Figure 31:
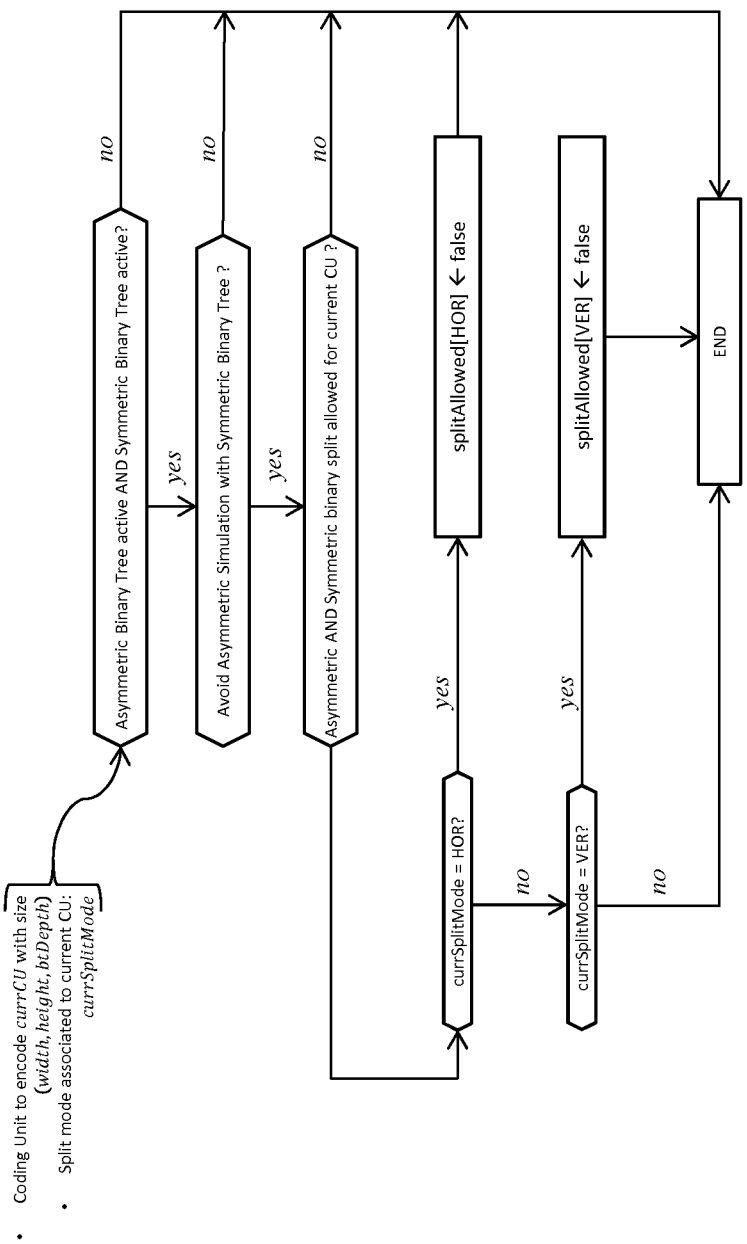
FIG. 31 shows an example of an embodiment to prioritize asymmetric binary tree splitting over symmetric binary tree splitting proposed herein.

Next, the process used to apply the prioritization of the Asymmetric Binary Tree over Symmetric Binary Tree as proposed herein is described. In case asymmetric and symmetric binary splits are activated and allowed for a current CU, then two main steps take place, respectively, for the horizontal and the vertical direction. One embodiment of the process is shown in FIG. 31.

Each of these main steps comprises the following, for example for the horizontal orientation. The method tests if the split mode of a current CU is equal to the binary horizontal split mode HOR. If so, then the HOR split mode is forbidden for all the sub-CUs of a current CU.

An analogous process is performed for the vertical orientation.

Next, the modifications brought to the normative CU splitting mode signaling in at least one of the present embodiments is depicted.

Table 1 shows the specification of the signaling of the splitting mode without the method proposed here.

TABLE 1

| triple/binary mode syntax according used for coding CUs, according to the initial asymmetric CU tool | | Descriptor |
|---|---|---|
| Bt_split_mode(x0,y0,width,height,cqtDepth){ | | |
|   if(btSplitAllowed(x0,y0,width,height){ | | |
|     btSplitFlag | | ae(v) |
|     if(horizontalSplitAllowed && horizontalSplitAllowed){ | | |
|       btSplitOrientation | | ae(v) |
|       if(btSplitOrientation==HOR && horizontal_asymmetric_allowed){ | | |
|         horAsymmetricSplitFlag | | ae(v) |
|         if(horAsymmetricSplitFlag==true && splitAllowed[HOR_UP] && splitAllowed[HOR_DOWN]){ | && | |
|           horizontal_asymmetric_type | | ae(v) |
|         } | | |
|         if(horAsymmetricSplitFlag==false && horizontal_triple_allowed){ | && | |
|           horizontal_triple_flag | | ae(v) |
|         } | | |
|       } | | |
|       if(btSplitOrientation==VER && vertical_asymmetric_allowed){ | | |
|         verAsymmetricSplitFlag | | ae(v) |
|         if(verAsymmetricSplitFlag==true && splitAllowed[VER_LEFT] && splitAllowed[VER_RIGHT]){ | && | |
|           vertical_asymmetric_type | | ae(v) |
|         } | | |
|         if(verAsymmetricSplitFlag==false && vertical_triple_allowed){ | && | |
|           vertical_triple_flag | | ae(v) |
|         } | | |
|       } | | |
|     } | | |
|   } | | |
| } | | |

Table 2 shows the specification of the signaling of the splitting mode with the method proposed here.

As can be seen, the normative modifications due to the proposed method lies in the modifications of the conditions under which some syntax elements appear in the bitstream. Basically, each time a flag that differentiates between the triple and binary symmetric or between an asymmetric and symmetric binary split, an additional condition is included, which tests if the symmetric binary split mode associated with the concerned orientation is allowed.

TABLE 2 triple/binary split mode syntax according used for coding CUs, according to method proposed here

|  | Descriptor |
|---|---|
| Bt_split_mode(x0,y0,width,height,cqtDepth){ |  |
|   if(btSplitAllowed(x0,y0,width,height){ |  |
|     btSplitFlag | ae(v) |
|     if(horizontalSplitAllowed && horizontalSplitAllowed){ |  |
|       btSplitOrientation | ae(v) |
|       if(btSplitOrientation==HOR && horizontal_asyminetric_allowed && splitAllowed[HOR]){ |  |
|         horAsymmetricSplitFlag | ae(v) |
|         if(horAsymmetricSplitFlag==true && splitAllowed[HOR_UP] && splitAllowed[HOR_DOWN]){ |  |
|           horizontal_asymmetric_type | ae(v) |
|         } |  |
|         if(horAsymmetricSplitFlag==false && horizontal_triple_allowed && splitAllowed[HOR]){ |  |
|           horizontal_triple_flag | ae(v) |
|         } |  |
|       } |  |
|       if(btSplitOrientation==VER && vertical_asymmetric_allowed && spplitAllowed[VER]){ |  |
|         verAsymmetricSplitFlag | ae(v) |
|         if(verAsymmetricSplitFlag==true && splitAllowed[VER_LEFT] && splitAllowed[VER_RIGHT]){ |  |
|           vertical_asymmetric_type | ae(v) |
|         } |  |
|         if(verAsymmetricSplitFlag==false && vertical_triple_allowed && splitAllowed[VER]){ |  |
|           vertical_triple_flag | ae(v) |
|         } |  |
|       } |  |
|     } |  |
|   } |  |
| } |  |

In a first alternate embodiment, the proposed restriction only modifies the prioritization between triple split and symmetric binary split.

In a first alternate embodiment, the proposed restriction only modifies the prioritization between asymmetric binary split and symmetric binary split.

In a third alternate embodiment, the proposed restriction modifies both the prioritization between triple split and symmetric binary split AND the prioritization between asymmetric binary split and symmetric binary split.

According to a variant, no prioritization between asymmetric tree and binary symmetric tree is applied, and some redundancy is allowed between different successions of splits that may reach a same spatial topology when dividing a CU into smaller coding units.

According to another variant, the prioritization of triple split over binary split is used in combination with allowing some redundancy between the asymmetric binary split and the binary symmetric split.

In a fourth alternate embodiment, the proposed prioritization jointly applies to the encoder and the decoder in a synchronous way, to jointly limit the combinations of the rate distortion search for best splitting modes in an encoder, while improving the coding efficiency for the encoder, bit-stream, and decoder system.

In a fifth alternate embodiment, the proposed prioritization only applies on the encoder side, to speed-up the rate distortion search for best splitting modes, with very limited loss in terms of coding efficiency.

The aforementioned embodiments have been described with respect to an encoder or encoding operation. However, the corresponding inverse operations are applicable to a decoder or decoding operation. For example, a decoding operation can perform decoding of at least one sub-block of a plurality of sub-blocks that comprise the block, using processing such that a transform that corresponds to each sub-block size is used, and reassembling the plurality of sub-blocks into the block, wherein reassembling comprises an inverse operation of dividing the block. The reassembling operation is substantially the inverse of the encoding dividing operations.

Figure 12:
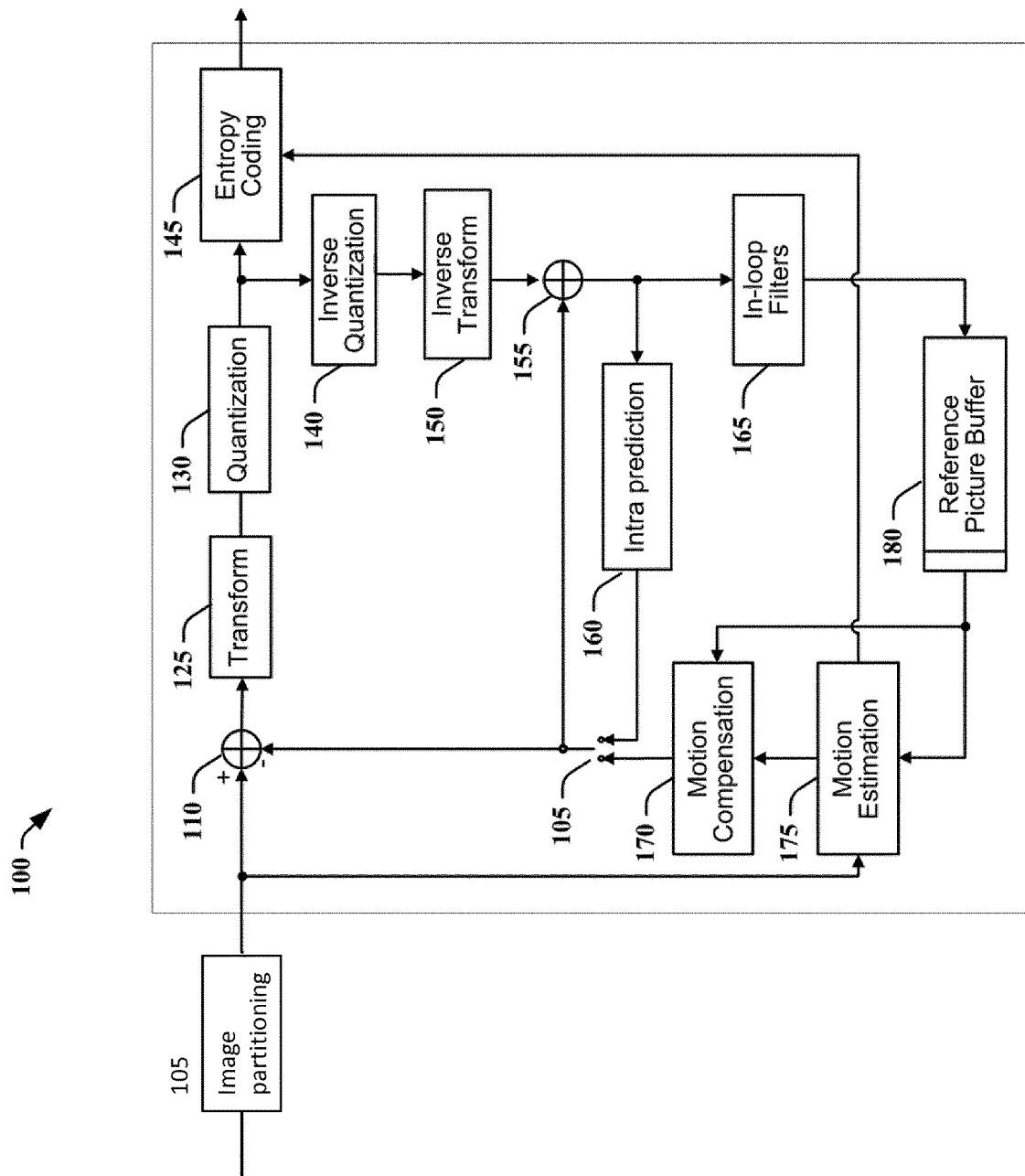
FIG. 12 shows an example of the proposed function block interfacing with a generic video compression scheme.

FIG. 12 shows an example of the proposed function block interfacing with a generic video compression scheme.

Figure 13:
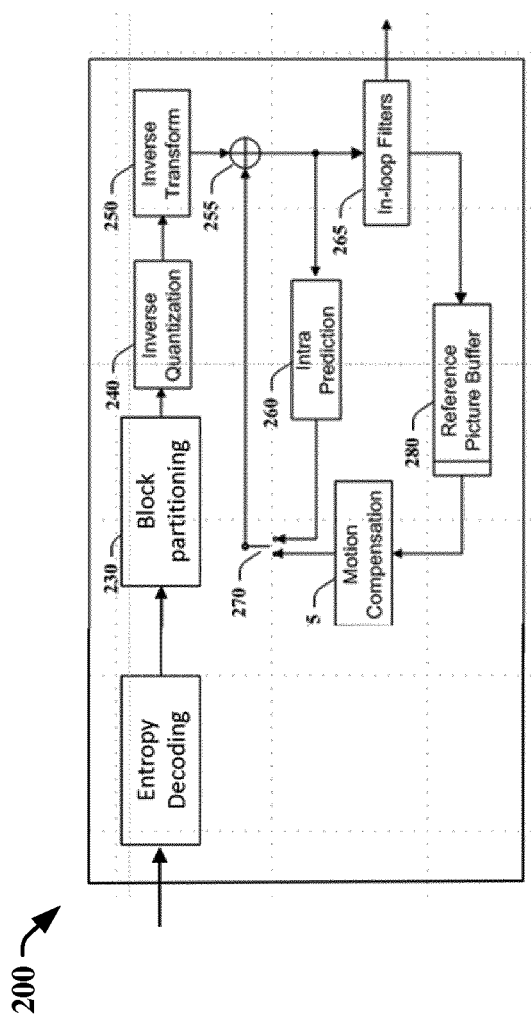
FIG. 13 shows a generic video decoding scheme.

FIG. 13 shows a video decoding scheme with block partitioning.

Figure 17:
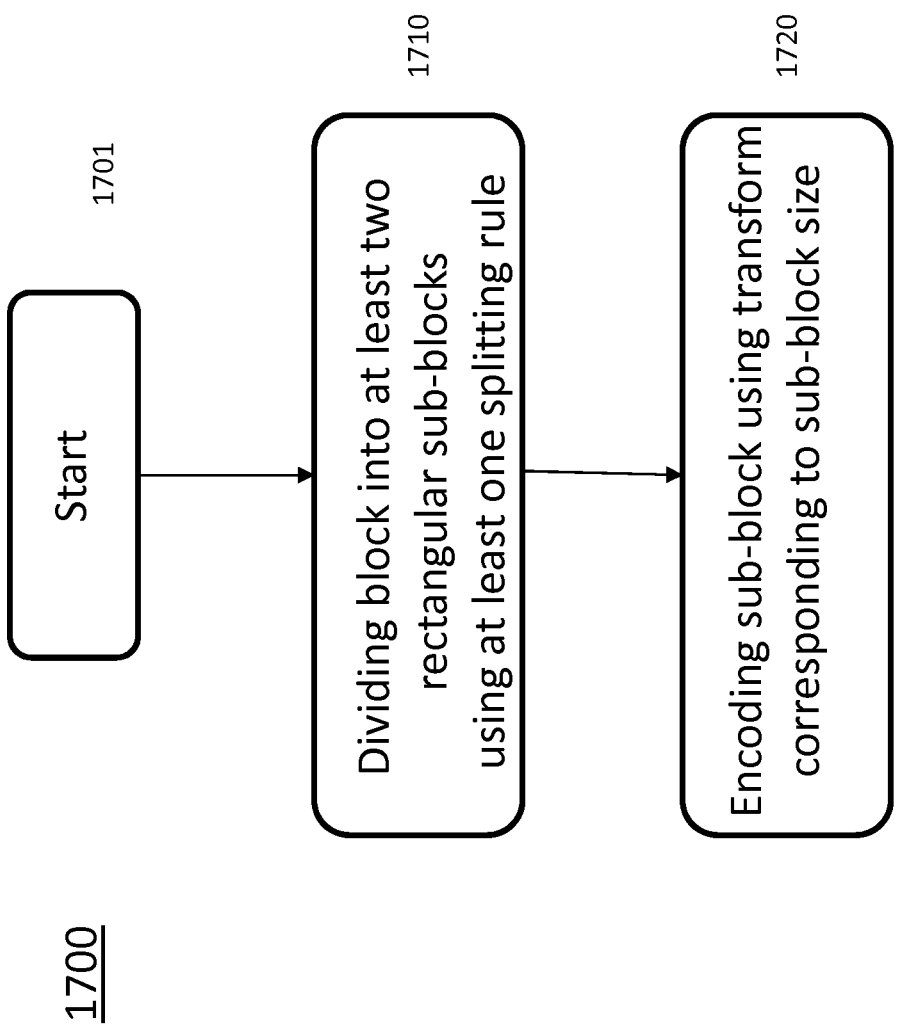
FIG. 17 shows one embodiment of a method for encoding a video block using one general aspect described herein.

FIG. 17 shows one embodiment of a method 1700 for coding a block of video data. The method commences at Start block 1701 and proceeds to block 1710 for dividing the block into at least two rectangular sub-blocks using at least one splitting rule. Control proceeds from block 1710 to block 1720 for encoding each sub-block using processing such that a transform that corresponds to each sub-block size is used.

Figure 18:
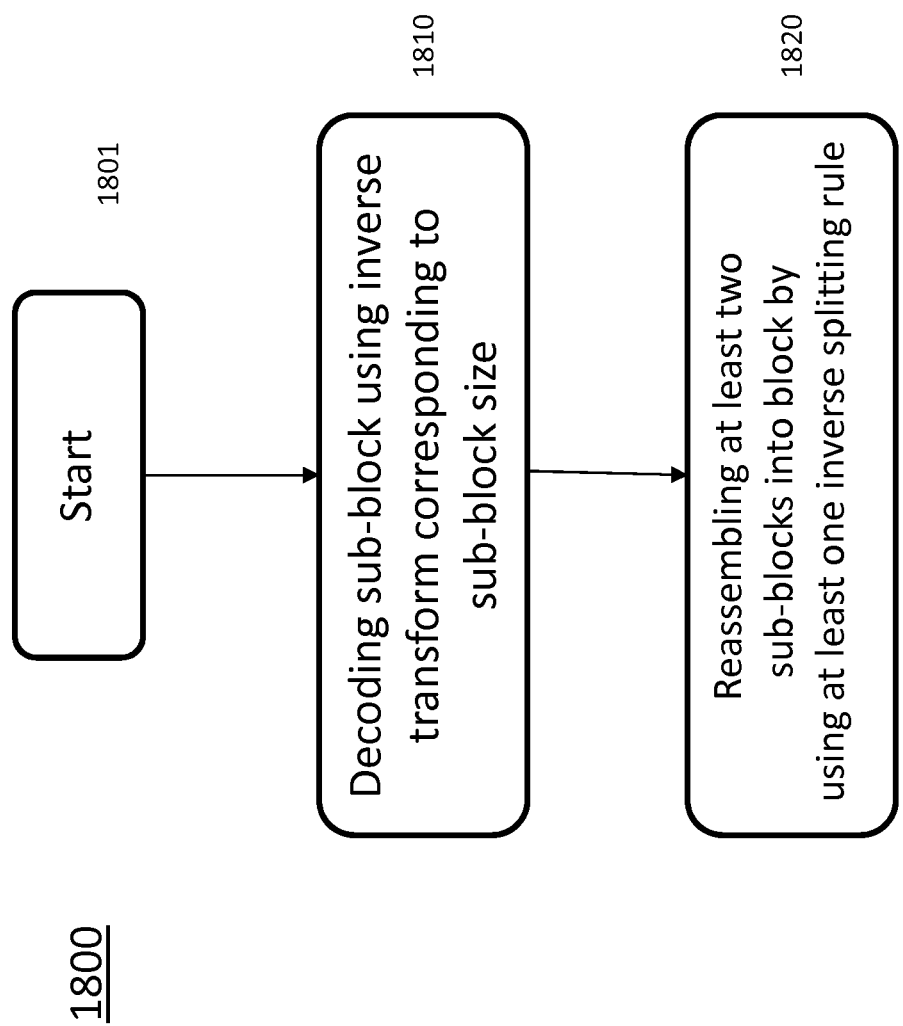
FIG. 18 shows another embodiment of a method for decoding a video block using one general aspect described herein.

FIG. 18 shows one embodiment of a method 1800 for decoding a block of video data. The method commences at Start block 1801 and proceeds to block 1810 for decoding at least one sub-block of a plurality of sub-blocks that comprise the block using processing such that a transform that corresponds to each sub-block size is used. Control then proceeds from block 1810 to block 1820 for reassembling the plurality of sub-blocks into a block, wherein reassembling comprises an inverse operation of dividing, or splitting, the block that had been split with at least one splitting rule.

Figure 20:
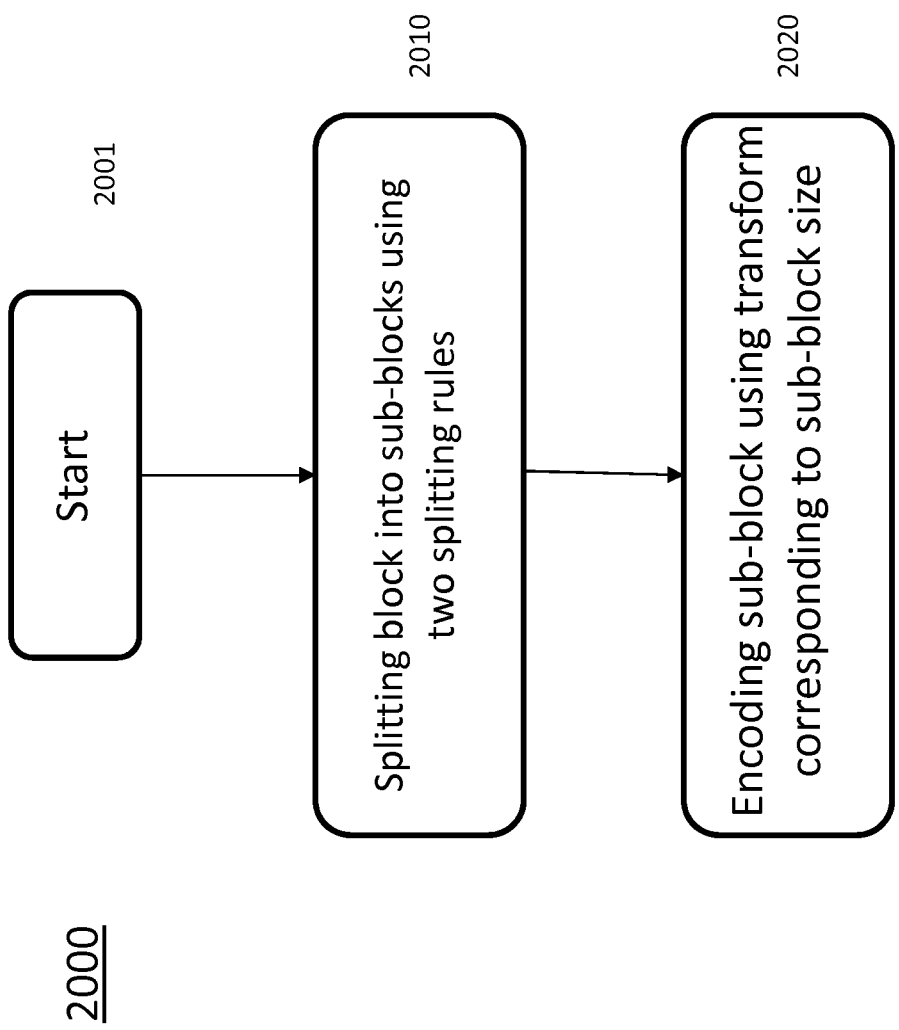
FIG. 20 shows another embodiment of a method for encoding a block of video data using at least one general aspect described herein.

FIG. 20 shows another embodiment of a method 2000 to implement the dividing of the aforementioned method or apparatus embodiments. The method commences at Start block 2001 and proceeds to block 2010 for splitting a block into sub-blocks using a triple tree splitting operation if said at least two rectangular sub-blocks can be achieved with two successions of split operations with at least one triple tree split, and using a asymmetric binary tree splitting if said at least two rectangular sub-blocks can be achieved with two successions of split operations with at least one asymmetric binary split. Control proceeds from block 2010 to block 2020 for encoding a sub-block using a transform corresponding to the sub-block size.

Figure 21:
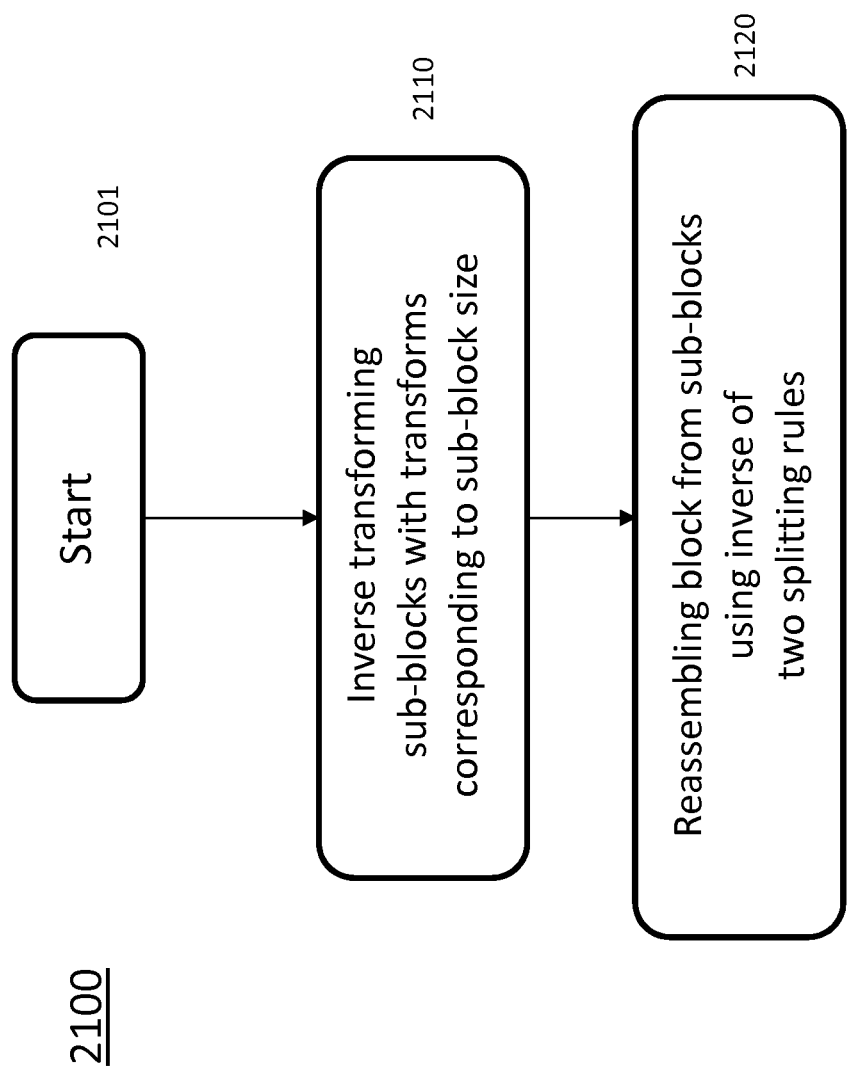
FIG. 21 shows another embodiment of a method for decoding a block of video data using at least one general aspect described herein.

FIG. 21 shows another embodiment of a method 2100 to implement the inverse dividing of the aforementioned method or apparatus embodiments. The method commences at Start block 2101 and proceeds to block 2110 for inverse transforming at least one sub-block with a transform corresponding to the sub-block size. Control proceeds from block 2110 to block 2120 for reassembling the block from multiple sub-blocks using the inverse of the two splitting rules.

Figure 19:
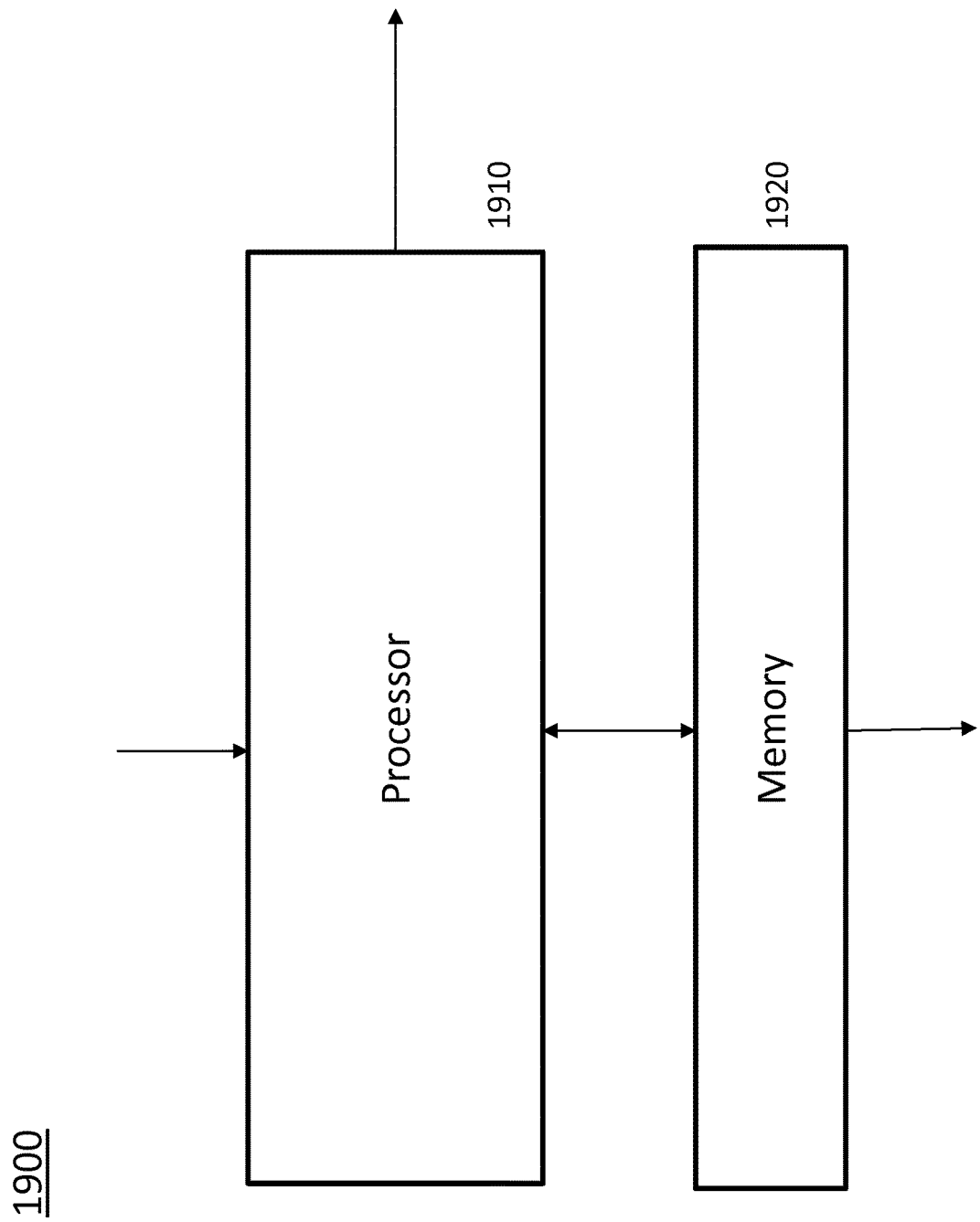
FIG. 19 shows one embodiment of an apparatus for encoding or decoding a block of video data using at least one general aspect described herein.

FIG. 19 shows one embodiment of an apparatus 1900 for coding or decoding a block of video data. The apparatus comprises Processor 1910 which has input and output ports and is in signal connectivity with Memory 1920, also having input and output ports. The apparatus can execute any of the aforementioned method embodiments, or variations.

The functions of the various elements shown in the figures can be provided using dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

The present description illustrates the present ideas. It will thus be appreciated that those skilled in the art will be able to devise various arrangements that, although not explicitly described or shown herein, embody the present ideas and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

In the claims herein, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method for coding a block of video data, comprising:
dividing said block into at least two rectangular sub-blocks by using binary or triple splits, wherein at least one rule is used in dividing said block, and
encoding each sub-block using processing wherein a transform that corresponds to each sub-block size is used,
wherein a triple split divides the block into three sub-blocks with respective sizes equal ¼, ½ and ¼ of the block size in a direction of a considered spatial division, wherein a binary split comprises symmetric binary splits and asymmetric binary splits that are either ⅓ or ¼ of the block size,
and wherein said rule comprises using a triple splitting operation if said at least two rectangular sub-blocks can be achieved with two successions of split operations with at least one triple split or achieved with only binary split operations, and using an asymmetric binary splitting if said at least two rectangular sub-blocks can be achieved with two successions of split operations with at least one asymmetric binary split or achieved with only symmetric binary split operations.

2. The method of claim 1, wherein said dividing comprises:
a one-half split, or a one-third and two-thirds split, or a one-fourth and three-fourths split, or a triple split.

3. The method of claim 2, wherein a first division is in a first direction, and a second division is in a second direction.

4. The method of claim 3, wherein directions used for said first division and said second division comprise horizontal or vertical.

5. A method for decoding a block of video data, comprising:
- decoding at least one sub-block of a plurality of sub-blocks that comprise said block, using processing, wherein an inverse transform that corresponds to each sub-block size is used, and
- reassembling the plurality of sub-blocks into said block, wherein reassembling comprises an inverse operation of dividing said block into at least two rectangular sub-blocks by using binary or triple splits, wherein at least one rule is used in dividing said block,
- wherein a triple split divides the block into three sub-blocks with respective sizes equal ¼, ½ and ¼ of the block size in a direction of a considered spatial division, wherein a binary split comprises symmetric binary splits and asymmetric binary splits that are either ⅓ or ¼ of the block size,
- and wherein said rule comprises using a triple splitting operation if said at least two rectangular sub-blocks can be achieved with two successions of split operations with at least one triple split or achieved with only binary split operations, and using an asymmetric binary splitting if said at least two rectangular sub-blocks can be achieved with two successions of split operations with at least one asymmetric binary split or achieved with only symmetric binary split operations.

6. The method of claim 5, wherein said dividing comprises:
- a one-half split, or a one-third and two-thirds split, or a one-fourth and three-fourths split, or a triple split.

7. The method of claim 6, wherein a first division is in a first direction, and a second division is in a second direction.

8. The method of claim 7, wherein directions used for said first division and said second division comprise horizontal or vertical.

9. The method of claim 5, wherein said reassembling differs from an inverse of a corresponding dividing that occurs during encoding.

10. The method of claim 5, wherein said reassembling is based on a signaling of a mode representative of said dividing of said block.

11. An apparatus for coding a block of video data, comprising:
- a memory, and
- a processor, configured to:
- divide said block into at least two rectangular sub-blocks by using binary or triple splits, wherein at least one rule is used in dividing said block, and
- encode each sub-block using processing wherein a transform that corresponds to each sub-block size is used,
- wherein a triple split divides the block into three sub-blocks with respective sizes equal ¼, ½ and ¼ of the block size in a direction of a considered spatial division, wherein a binary split comprises symmetric binary splits and asymmetric binary splits that are either ⅓ or ¼ of the block size,
- and wherein said rule comprises using a triple splitting operation if said at least two rectangular sub-blocks can be achieved with two successions of split operations with at least one triple split or achieved with only binary split operations, and using an asymmetric binary splitting if said at least two rectangular sub-blocks can be achieved with two successions of split operations with at least one asymmetric binary split or achieved with only symmetric binary split operations.

12. The apparatus of claim 11, wherein said dividing comprises:
- a one-half split, or a one-third and two-thirds split, or a one-fourth and three-fourths split, or a triple split.

13. The apparatus of claim 12, wherein a first division is in a first direction, and a second division is in a second direction.

14. The apparatus of claim 13, wherein directions used for said first division and said second division comprise horizontal or vertical.

15. An apparatus for decoding a block of video data, comprising:
- a memory, and
- a processor, configured to:
- decode at least one sub-block of a plurality of sub-blocks that comprise said block, using processing such that a transform that corresponds to each sub-block size is used, and
- reassemble the plurality of sub-blocks into said block, wherein reassembling comprises an inverse operation of dividing said block into at least two rectangular sub-blocks by using binary or triple splits such that at least one rule is used in dividing said block,
- wherein a triple split divides the block into three sub-blocks with respective sizes equal ¼, ½ and ¼ of the block size in a direction of a considered spatial division, wherein a binary split comprises symmetric binary splits and asymmetric binary splits that are either ⅓ or ¼ of the block size,,
- and wherein said rule comprises using a triple splitting operation if said at least two rectangular sub-blocks can be achieved with two successions of split operations with at least one triple split, and using an asymmetric binary splitting if said at least two rectangular sub-blocks can be achieved with two successions of split operations with at least one asymmetric binary split.

16. The apparatus of claim 15, wherein said dividing comprises:
- a one-half split, or a one-third and two-thirds split, or a one-fourth and three-fourths split, or a triple split.

17. The apparatus of claim 16, wherein a first division is in a first direction, and a second division is in a second direction.

18. The apparatus of claim 17, wherein directions used for said first division and said second division comprise horizontal or vertical.

19. The apparatus of claim 15, wherein the processor is configured to reassemble the plurality of sub-blocks in a manner differing from an inverse of a corresponding dividing that occurs during encoding.

20. The apparatus of claim 15, wherein the processor is configured to reassemble the plurality of sub-blocks based on a signaling of a mode representative of said dividing of said block.

21. A non-transitory computer readable medium containing data content generated according to the method of claim 1, for playback using a processor.

22. A non-transitory computer readable medium storing program instructions which, when executed by a computer, cause the computer to carry out the method of claim 5.

* * * * *